United States Patent
Sorin

(10) Patent No.: US 9,213,472 B2
(45) Date of Patent: Dec. 15, 2015

(54) USER INTERFACE FOR PROVIDING SUPPLEMENTAL INFORMATION

(71) Applicant: Alexander Sorin, Scotts Valley, CA (US)

(72) Inventor: Alexander Sorin, Scotts Valley, CA (US)

(73) Assignee: SAP SE, Walldorf (DE)

(*) Notice: Subject to any disclaimer, the term of this patent is extended or adjusted under 35 U.S.C. 154(b) by 422 days.

(21) Appl. No.: 13/797,332

(22) Filed: Mar. 12, 2013

(65) Prior Publication Data

US 2014/0282230 A1    Sep. 18, 2014

(51) Int. Cl.
*G06F 3/0484*    (2013.01)
*G06F 3/0488*    (2013.01)

(52) U.S. Cl.
CPC .......... *G06F 3/0484* (2013.01); *G06F 3/04886* (2013.01)

(58) Field of Classification Search
CPC ......... G06F 3/00; G06F 3/048; G06F 3/0481; G06F 3/0482; G06F 9/44543; G06F 9/4443; G06F 2203/04804; G06F 9/44
See application file for complete search history.

(56) References Cited

U.S. PATENT DOCUMENTS

| | | | |
|---|---|---|---|
| 5,467,441 A * | 11/1995 | Stone et al. .................... 345/619 |
| 6,847,967 B1 | 1/2005 | Takano | |
| 6,854,087 B1 * | 2/2005 | Takeo et al. .................... 715/203 |
| 7,127,473 B2 | 10/2006 | Agassi et al. | |
| 7,246,323 B2 | 7/2007 | Uemura et al. | |
| 7,321,887 B2 | 1/2008 | Dorner et al. | |
| 7,555,557 B2 | 6/2009 | Bradley et al. | |
| 8,200,666 B2 | 6/2012 | Bartomeli et al. | |
| 8,510,660 B2 | 8/2013 | Morin et al. | |
| 8,516,046 B1 * | 8/2013 | Xu .................................. 709/204 |
| 8,578,278 B2 | 11/2013 | Rauh et al. | |
| 8,621,385 B2 | 12/2013 | Sauermann | |
| 2004/0003097 A1 | 1/2004 | Willis et al. | |
| 2004/0122898 A1 * | 6/2004 | Srinivasa ........................ 709/205 |
| 2005/0256813 A1 | 11/2005 | Bahbouh et al. | |
| 2006/0174209 A1 * | 8/2006 | Barros ........................... 715/764 |
| 2007/0106952 A1 * | 5/2007 | Matas et al. .................... 715/764 |
| 2010/0251094 A1 | 9/2010 | Holm et al. | |
| 2013/0027425 A1 | 1/2013 | Yuan | |
| 2013/0159272 A1 | 6/2013 | Donmez et al. | |
| 2014/0032616 A1 | 1/2014 | Nack | |
| 2014/0186010 A1 * | 7/2014 | Guckenberger et al. ....... 386/248 |

FOREIGN PATENT DOCUMENTS

FR    2969333    * 12/2010    ............... G06F 9/44

* cited by examiner

*Primary Examiner* — Xiomar L Bautista
(74) *Attorney, Agent, or Firm* — Schwegman Lundberg & Woessner, P.A.

(57) ABSTRACT

A user interface for providing supplemental information is disclosed. Working content may be caused to be displayed in a display zone of a graphical user interface of a device. The working content may comprise a plurality of graphical objects. A data overlay may be caused to be displayed in the display zone. The data overlay may overlay and at least partially obscure a corresponding portion of the working content. The data overlay may include unchanged graphical objects and at least one additional graphical object. The unchanged graphical objects in the data overlay may be aligned with and overlay corresponding graphical objects of the plurality of graphical objects in the corresponding portion of the working content. The additional graphical object(s) may represent a modification to the corresponding portion of the working content.

17 Claims, 24 Drawing Sheets

*FIG. 5A*

| | Week 1 | | | | | Week 2 | | | | | Week 3 | | | | | Week 4 | | | | |
|---|---|---|---|---|---|---|---|---|---|---|---|---|---|---|---|---|---|---|---|---|
| | Mon | Tues | Wed | Thr | Fri | Mon | Tues | Wed | Thr | Fri | Mon | Tues | Wed | Thr | Fri | Mon | Tues | Wed | Thr | Fri |
| P1 | 10 | 10 | 9 | 10 | 10 | 8 | 8 | 9 | 9 | 9 | 9 | 9 | 9 | 9 | 9 | 7 | 9 | 10 | 10 | 10 |
| P2 | 4 | 3 | 4 | 3 | 3 | 3 | 5 | 5 | 5 | 5 | 5 | 5 | 5 | 5 | 5 | 6 | 6 | 6 | 6 | 6 |
| P3 | 6 | 6 | 6 | 6 | 6 | 5 | 5 | 5 | 3 | 3 | 3 | 3 | 3 | 3 | 3 | 0 | 0 | 0 | 0 | 0 |
| P4 | 8 | 8 | 8 | 8 | 8 | 7 | 5 | 5 | 5 | 5 | 8 | 8 | 8 | 8 | 8 | 8 | 8 | 8 | 8 | 8 |
| P5 | 3 | 3 | 3 | 0 | 0 | 5 | 5 | 7 | 7 | 7 | 7 | 7 | 6 | 6 | 6 | 5 | 5 | 5 | 5 | 5 |
| P6 | 0 | 0 | 0 | 0 | 0 | 0 | 0 | 0 | 3 | 3 | 0 | 0 | 0 | 0 | 0 | 32 | 32 | 32 | 32 | 32 |
| P7 | 31 | 30 | 29 | 30 | 30 | 28 | 24 | 29 | 32 | 33 | 32 | 32 | 31 | 31 | 31 | 29 | 29 | 29 | 29 | 29 |
| | Week 5 | | | | | Week 6 | | | | | Week 7 | | | | | Week 8 | | | | |
| | Mon | Tues | Wed | Thr | Fri | Mon | Tues | Wed | Thr | Fri | Mon | Tues | Wed | Thr | Fri | Mon | Tues | Wed | Thr | Fri |
| P1 | 9 | 9 | 8 | 9 | 9 | 5 | 7 | 8 | 8 | 8 | 8 | 10 | 9 | 9 | 9 | 6 | 6 | 4 | 4 | 4 |
| P2 | 5 | 5 | 5 | 5 | 5 | 4 | 4 | 5 | 5 | 5 | 6 | 4 | 4 | 4 | 4 | 5 | 5 | 4 | 6 | 6 |
| P3 | 9 | 9 | 9 | 9 | 9 | 8 | 4 | 3 | 3 | 3 | 6 | 6 | 5 | 5 | 5 | 4 | 5 | 5 | 6 | 5 |
| P4 | 2 | 2 | 2 | 2 | 2 | 4 | 4 | 4 | 4 | 4 | 5 | 5 | 0 | 0 | 0 | 1 | 2 | 3 | 3 | 1 |
| P5 | 1 | 1 | 1 | 1 | 1 | 3 | 0 | 1 | 5 | 5 | 7 | 5 | 7 | 7 | 7 | 8 | 7 | 7 | 9 | 7 |
| P6 | 2 | 2 | 2 | 2 | 2 | 3 | 6 | 6 | 4 | 4 | 5 | 7 | 8 | 8 | 8 | 6 | 6 | 6 | 5 | 6 |
| P7 | 31 | 30 | 30 | 30 | 30 | 28 | 24 | 29 | 32 | 32 | 34 | 31 | 31 | 31 | 31 | 29 | 29 | 29 | 29 | 32 |
| | Week 9 | | | | | Week 10 | | | | | Week 11 | | | | | Week 12 | | | | |
| | Mon | Tues | Wed | Thr | Fri | Mon | Tues | Wed | Thr | Fri | Mon | Tues | Wed | Thr | Fri | Mon | Tues | Wed | Thr | Fri |
| P1 | 9 | 11 | 10 | 11 | 11 | 9 | 11 | 8 | 8 | 8 | 7 | 3 | 4 | 4 | 4 | 7 | 8 | 10 | 9 | 8 |
| P2 | 5 | 2 | 3 | 4 | 2 | 4 | 6 | 4 | 5 | 5 | 3 | 2 | 2 | 2 | 2 | 6 | 9 | 3 | 3 | 2 |
| P3 | 7 | 7 | 6 | 5 | 7 | 7 | 2 | 3 | 6 | 6 | 6 | 1 | 6 | 6 | 4 | 2 | 2 | 2 | 2 | 5 |
| P4 | 2 | 2 | 2 | 2 | 2 | 4 | 3 | 4 | 6 | 6 | 4 | 2 | 1 | 1 | 1 | 5 | 3 | 5 | 8 | 8 |
| P5 | 1 | 1 | 1 | 1 | 1 | 6 | 2 | 3 | 6 | 6 | 9 | 9 | 8 | 9 | 7 | 8 | 5 | 5 | 8 | 3 |
| P6 | 1 | 1 | 1 | 1 | 1 | 3 | 3 | 3 | 1 | 1 | 7 | 6 | 7 | 7 | 6 | 1 | 1 | 3 | 1 | 4 |
| P7 | 31 | 30 | 29 | 31 | 30 | 28 | 29 | 29 | 32 | 32 | 34 | 31 | 32 | 33 | 33 | 29 | 31 | 31 | 28 | 30 |

Projects Staffing Q1 2011

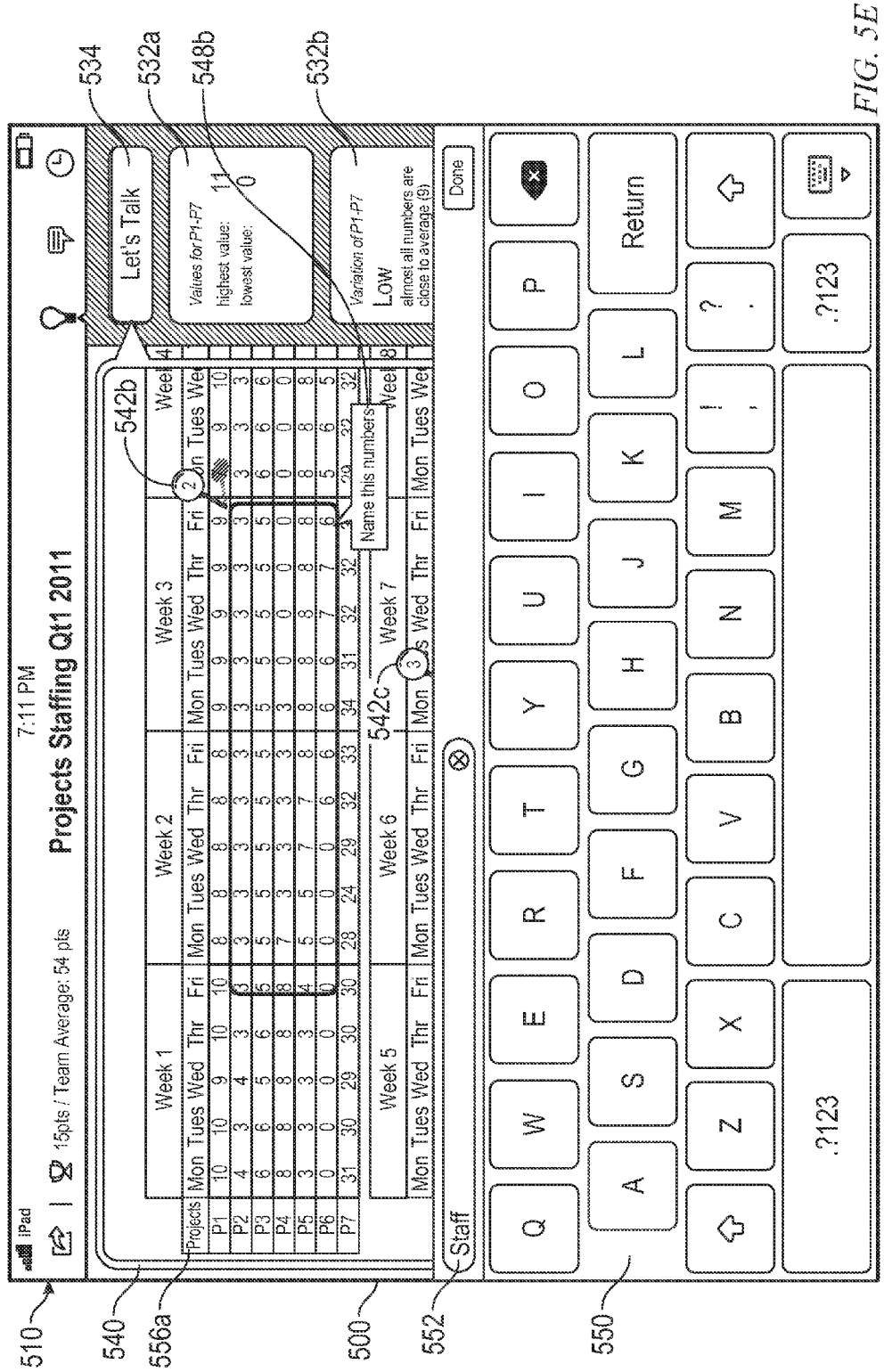

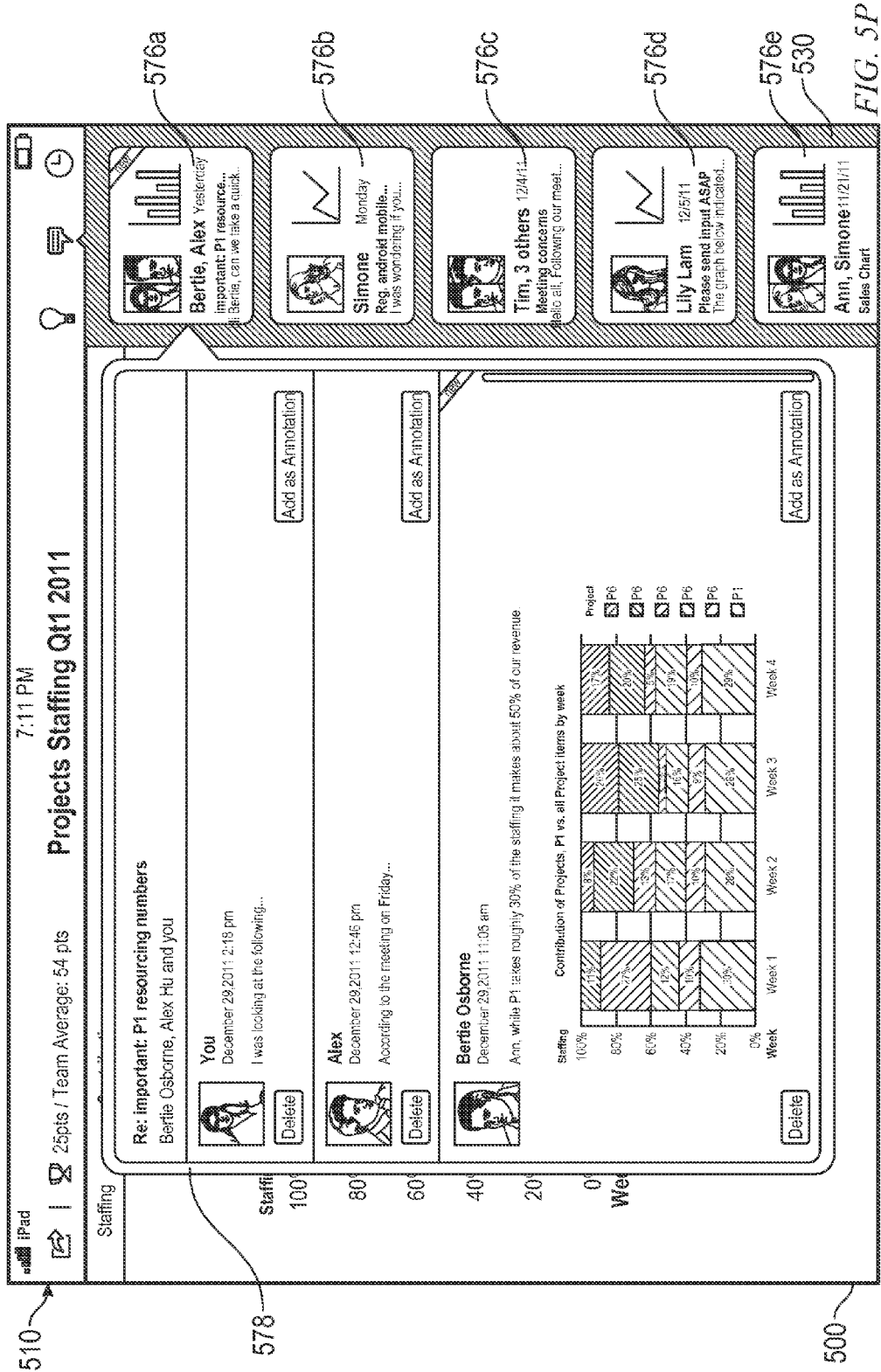

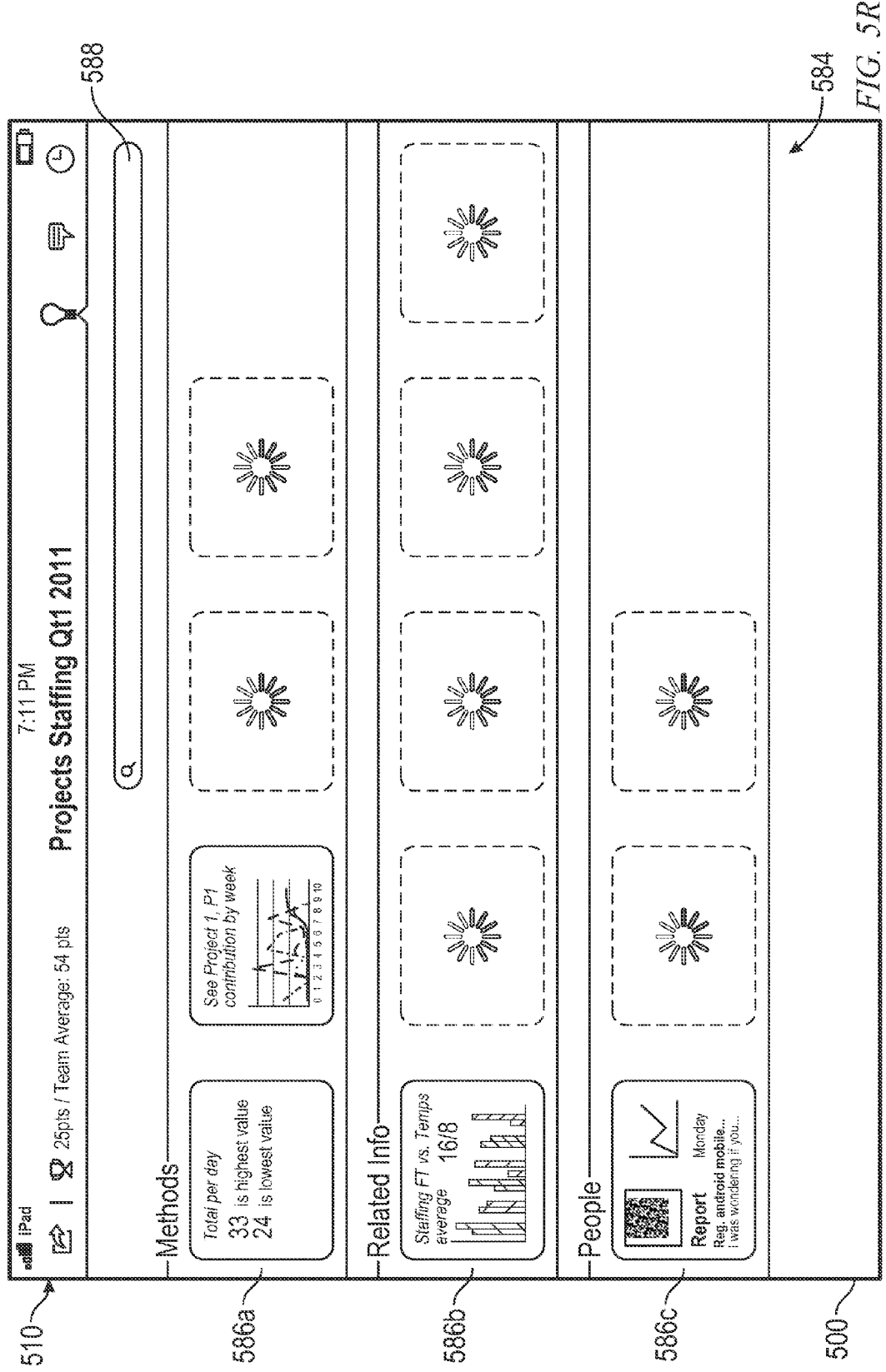

USER INTERFACE FOR PROVIDING SUPPLEMENTAL INFORMATION

TECHNICAL FIELD

The present application relates generally to the technical field of data processing, and, in various embodiments, to a user interface for providing supplemental information.

BACKGROUND

Many casual users of business information demonstrate an apparent lack of initiative to go beyond their rudimentary quantitative practices. This seems to be true even with people who frequently work with numerical data as part of their job. This may be because they suffer from limitations in their ability to think quantitatively about everyday business questions and tasks, and therefore have difficulty seeing the potential value of going somewhat deeper in their analyses. As a result of these and other limitations, they do not take full advantage of the potential value in the quantitative information that is available to them. In addition, casual users of business information have difficulty integrating qualitative thinking with quantitative thinking. They have difficulty thinking of a way to use related data to assess their qualitative explanations. Qualitative information that is relevant to interpreting quantitative patterns tends to live in an individual's head, rather than being shared along with the numbers. In addition, they face systemic and organizational barriers hindering their adoption of tools. When dealing with data in the context of a software application, these users do not have a solution that would help them to make sense of various types of information. The business implications of these issues are significant. Many business users engage in faulty decision-making leading to wasted money, significant inefficiencies, and reduced transparency.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
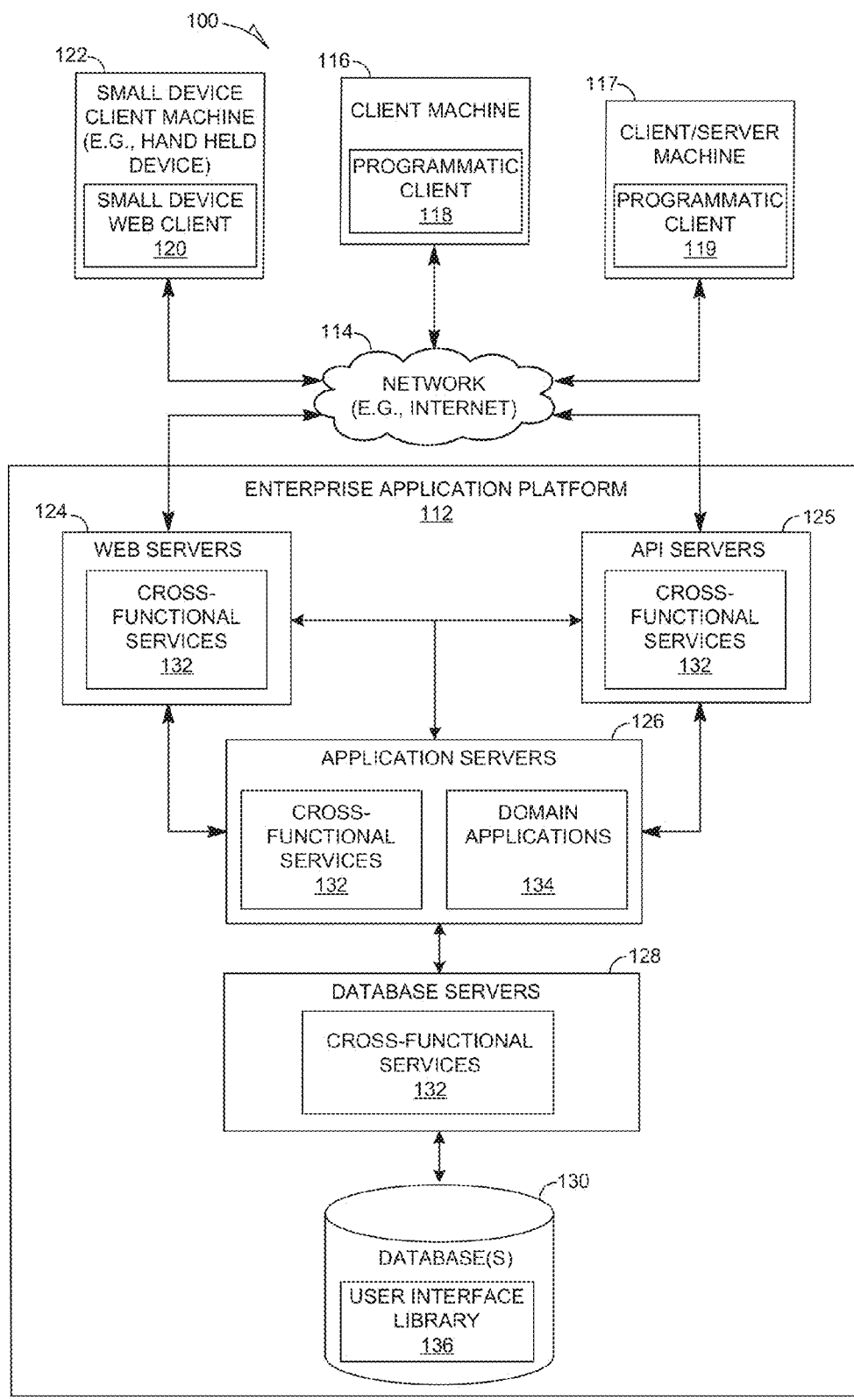
FIG. 1 is a network diagram illustrating a client-server system, in accordance with an example embodiment.

Example methods and systems of providing supplemental information for content to help users make sense of the content are described. In the following description, for purposes of explanation, numerous specific details are set forth in order to provide a thorough understanding of example embodiments. It will be evident, however, to one skilled in the art that the present embodiments may be practiced without these specific details.

In some embodiments, a graphical user interface (GUI) may superimpose supplemental information on a user's working content, which helps give the user a clear understanding of the relevance of the supplemental information to the user's working content. The user's working content may be any content that the user can work on (e.g., make modifications to) within the context of a software application. For example, a user may create and modify a table of data within the context of a spreadsheet application (e.g., Microsoft Excel). In this example, the user's working content may comprise the table of data. Other examples of working content may include, but are not limited to, a chart of data, text, and a report. The GUI may employ preview layer, which may be integrated with any application working environment. This preview layer may contain supplemental information and operational user interface elements (e.g., buttons). The GUI may help create a user experience of direct data entry into the user's working content (e.g., table, text, chart, report, etc.) via the preview layer. By placing the supplemental information directly onto the user's working content via the preview layer, the user is able to preview the results of the application of the supplemental information to the working content even before committing to the application of the supplemental information to the working content. These features encourage users to overcome inertia and the limitations of their quantitative and qualitative thinking.

In some embodiments, a computer-implemented method may comprise causing working content to be displayed in a display zone of a graphical user interface of a device. The working content may comprise a plurality of graphical objects. The method may also comprise causing a data overlay to be displayed in the display zone. The data overlay may overlay and at least partially obscure a corresponding portion of the working content. The data overlay may include unchanged graphical objects and at least one additional graphical object. The unchanged graphical objects in the data overlay may be aligned with and overlay corresponding graphical objects of the plurality of graphical objects in the corresponding portion of the working content. The additional graphical object(s) may represent a modification to the corresponding portion of the working content.

In some embodiments, the unchanged graphical objects and the additional graphical object(s) may comprise information in the form of alphabetical data, numerical data, and/or graphical data. In some embodiments, the additional graphical object(s) may comprise at least one additional detail related to the working content. In some embodiments, the data overlay may comprise a semi-transparent window.

In some embodiments, the method may further comprise applying the additional graphical object(s) to the corresponding portion of the working content in response to a user action on the device subsequent to the display of the data overlay overlaying the corresponding portion of the working content, causing the application of the additional graphical object(s) to the corresponding portion of the working content to be displayed on the device separately from the data overlay, and storing the application of the additional graphical object(s) to the corresponding portion of the working content in a database.

In some embodiments, the method may further comprise causing a plurality of supplemental information items to be displayed on the device. Each one of the supplemental information items may comprise at least one additional detail related to the working content. The step of causing the data overlay to be displayed may be performed in response to receiving a user selection of one of the supplemental information items. The selected supplemental information item may correspond to the additional graphical object(s) in the data overlay.

In some embodiments, the method may further comprise receiving a user selection of a portion of the working content, and determining what supplemental information items to include in the plurality of supplemental information items based on the user selection of the portion of the working content.

In some embodiments, the plurality of supplemental information items may be caused to be displayed within a panel positioned adjacent to the working content. In some embodiments, the working content may comprise a table of data or a chart of data.

In some embodiments, the method may further comprise causing a history of modifications to the content that resulted from applying additional graphical objects from the data overlay to the working content to be displayed on the device.

In some embodiments, the method may further comprise capturing at least a portion of the working content, generating a message that comprises the captured working content, and enabling a first user to add text to the message before the message is sent to a second user.

In some embodiments, a system may comprise a machine having at least one processor, and a supplemental information module on the machine. The supplemental information module may be configured to cause working content to be displayed in a display zone of a graphical user interface of a device. The working content may comprise a plurality of graphical objects. The supplemental information module may also be configured to cause a data overlay to be displayed in the display zone. The data overlay may overlay and at least partially obscure a corresponding portion of the working content. The data overlay may include unchanged graphical objects and at least one additional graphical object. The unchanged graphical objects in the data overlay may be aligned with and overlay corresponding graphical objects of the plurality of graphical objects in the corresponding portion of the working content. The additional graphical object(s) may represent a modification to the corresponding portion of the working content.

In some embodiments, the unchanged graphical objects and the additional graphical object(s) may comprise information in the form of at least one of alphabetical data, numerical data, and graphical data. In some embodiments, the additional graphical object(s) may comprise at least one additional detail related to the working content. In some embodiments, the data overlay may comprise a semi-transparent window.

In some embodiments, the supplemental information module may be further configured to cause a plurality of supplemental information items to be displayed on the device. Each one of the supplemental information items may comprise at least one additional detail related to the working content. The supplemental information module may also be configured to cause the data overlay to be displayed in the display zone in response to receiving a user selection of one of the supplemental information items. The selected supplemental information item may correspond to the additional graphical object(s) in the data overlay.

In some embodiments, the supplemental information module may be further configured to receive a user selection of a portion of the working content, and to determine what supplemental information items to include in the plurality of supplemental information items based on the user selection of the portion of the working content.

In some embodiments, a non-transitory machine-readable storage device may store a set of instructions that, when executed by at least one processor, causes the at least one processor to perform the operations and method steps discussed within the present disclosure.

FIG. 1 is a network diagram illustrating a client-server system, in accordance with an example embodiment. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser, such as the INTERNET EXPLORER browser developed by Microsoft Corporation of Redmond, Wash. State), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 may be coupled to, and provide web and programmatic interfaces to, application servers 126. The application servers 126 may be, in turn, coupled to one or more database servers 128 that facilitate access to one or more databases 130. The web servers 124, Application Program Interface (API) servers 125, application servers 126, and database servers 128 may host cross-functional services 132. The application servers 126 may further host domain applications 134.

The cross-functional services 132 provide services to users and processes that utilize the enterprise application platform 112. For instance, the cross-functional services 132 may provide portal services (e.g., web services), database services and connectivity to the domain applications 134 for users that operate the client machine 116, the client/server machine 117 and the small device client machine 122. In addition, the cross-functional services 132 may provide an environment for delivering enhancements to existing applications and for integrating third-party and legacy applications with existing cross-functional services 132 and domain applications 134. Further, while the system 100 shown in FIG. 1 employs a client-server architecture, the embodiments of the present invention are of course not limited to such an architecture, and could equally well find application in a distributed, or peer-to-peer, architecture system.

Figure 2:
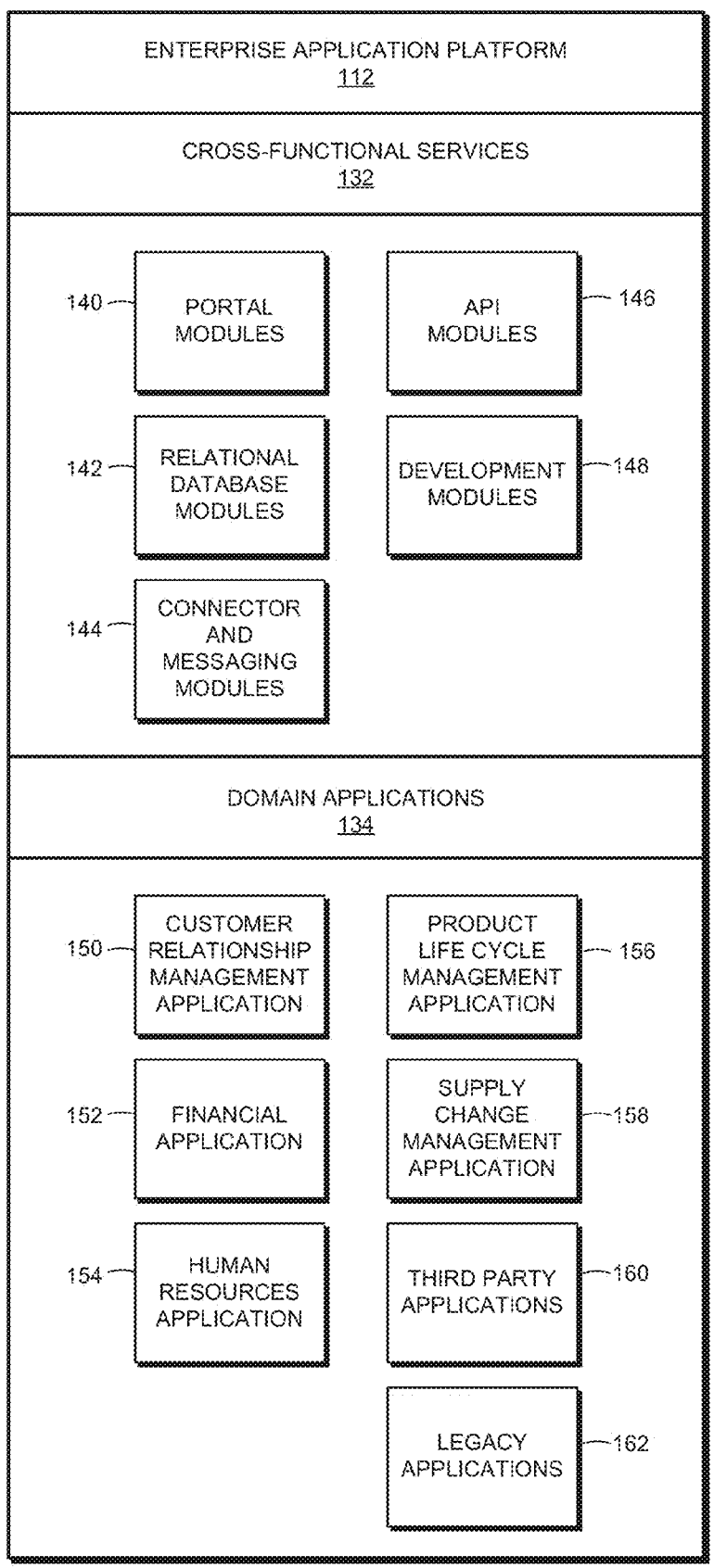
FIG. 2 is a block diagram illustrating enterprise applications and services in an enterprise application platform, in accordance with an example embodiment.

FIG. 2 is a block diagram illustrating enterprise applications and services in an enterprise application platform 112, in accordance with an example embodiment. The enterprise application platform 112 includes cross-functional services 132 and domain applications 134. The cross-functional services 132 may include portal modules 140, relational database modules 142, connector and messaging modules 144, Application Program Interface (API) modules 146, and development modules 148.

The portal modules 140 may enable a single point of access to other cross-functional services 132 and domain applications 134 for the client machine 116, the small device client machine 122 and the client/server machine 117. The portal modules 140 may be utilized to process, author and maintain web pages that present content (e.g., user interface elements and navigational controls) to the user. In addition, the portal modules 140 may enable user roles, a construct that associates a role with a specialized environment that is utilized by a user to execute tasks, utilize services and exchange information with other users and within a defined scope. For example, the role may determine the content that is available to the user and the activities that the user may perform. The portal modules 140 include a generation module, a communication module, a receiving module and a regenerating module. In addition the portal modules 140 may comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 may provide support services for access to the database(s) 130, which includes a user interface library 136. The relational database modules 142 may provide support for object relational mapping, database independence and distributed computing. The relational database modules 142 may be utilized to add, delete, update and manage database elements. In addition, the relational database modules 142 may comply with database standards and/or utilize a variety of database technologies including SQL, SQLDBC, Oracle, MySQL, Unicode, JDBC.

The connector and messaging modules 144 may enable communication across different types of messaging systems that are utilized by the cross-functional services 132 and the domain applications 134 by providing a common messaging application processing interface. The connector and messaging modules 144 may enable asynchronous communication on the enterprise application platform 112.

The Application Program Interface (API) modules 146 may enable the development of service-based applications by exposing an interface to existing and new applications as services. Repositories may be included in the platform as a central place to find available services when building applications.

The development modules 148 may provide a development environment for the addition, integration, updating and extension of software components on the enterprise application platform 112 without impacting existing cross-functional services 132 and domain applications 134.

Turning to the domain applications 134, the customer relationship management application 150 may enable access to and may facilitate collecting and storing of relevant personalized information from multiple data sources and business processes. Enterprise personnel that are tasked with developing a buyer into a long-term customer may utilize the customer relationship management applications 150 to provide assistance to the buyer throughout a customer engagement cycle.

Enterprise personnel may utilize the financial applications 152 and business processes to track and control financial transactions within the enterprise application platform 112. The financial applications 152 may facilitate the execution of operational, analytical and collaborative tasks that are associated with financial management. Specifically, the financial applications 152 may enable the performance of tasks related to financial accountability, planning, forecasting, and managing the cost of finance.

The human resource applications 154 may be utilized by enterprise personnel and business processes to manage, deploy, and track enterprise personnel. Specifically, the human resource applications 154 may enable the analysis of human resource issues and facilitate human resource decisions based on real time information.

The product life cycle management applications 156 may enable the management of a product throughout the life cycle of the product. For example, the product life cycle management applications 156 may enable collaborative engineering, custom product development, project management, asset management and quality management among business partners.

The supply chain management applications 158 may enable monitoring of performances that are observed in supply chains. The supply chain management applications 158 may facilitate adherence to production plans and on-time delivery of products and services.

The third-party applications 160, as well as legacy applications 162, may be integrated with domain applications 134 and utilize cross-functional services 132 on the enterprise application platform 112.

Figure 3:
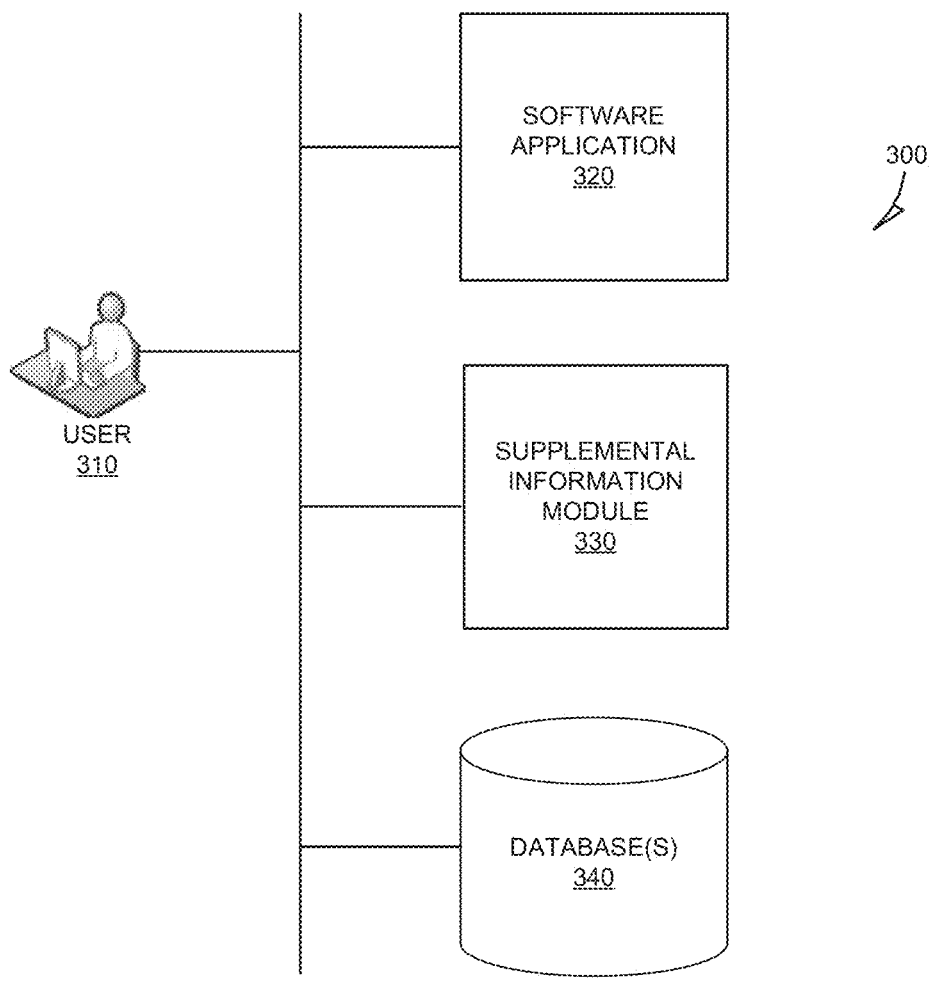
FIG. 3 is a block diagram of a supplemental information system, in accordance with an example embodiment.

FIG. 3 is a block diagram of a supplemental information system 300, in accordance with an example embodiment. In some embodiments, the supplemental information system 300 may be configured to provide supplemental information for working content of a user 310 who is using a software application 320 while on a device (e.g., any of machines 116, 117, and 122 in FIG. 1). The working content may be any content that the user can work on (e.g., make modifications to) within the context of the software application 320. For example, a user may create and modify a table of data within the context of a spreadsheet application (e.g., Microsoft Excel). In this example, the user's working content may comprise the table of data. Other examples of working content may include, but are not limited to, a chart of data, text, and a report. It is contemplated that other types of working content are also within the scope of the present disclosure.

In some embodiments, the supplemental information system 300 may comprise a supplemental information module 330. The supplemental information module 330 may reside on a machine having at least one processor (not shown). The supplemental information module 330 may be configured to cause supplemental information to be displayed on the device of the user 310 concurrently with working content. In some embodiments, the supplemental information may comprise information about or be otherwise related to the working content. In some embodiments, the supplemental information may comprise one or more recommended modifications to the working content. In some embodiments, the one or more recommended modifications may comprise an addition of at least one additional detail related to the working content.

In some embodiments, the supplemental information module 330 may be configured to generate and/or provide the supplemental information based on the working content and one or more other inputs. These other inputs may include, but are not limited to, a model of categories of analysis (e.g., a library of templates for a set of analytical tasks within each category that are commonly relevant), identifying information for different structures of data so that the structure of elements and the types of data in the working content may be recognized, the user's history of interactions with working content and/or recommendations, other users' history of interactions with working content and/or recommendations, and best practices of a community of users. It is contemplated that other types of inputs may be used by the supplemental information module 330 to generate and/or provide the supplemental information. In some embodiments, these inputs may be stored and retrieved from one or more databases 340.

In some embodiments, the supplemental information module 330 may be a plug-in or an extension that provides additional functionality to the software application 320. In some embodiments, the supplemental information module 330 may be provided as a stand-alone software application. In some embodiments, the supplemental information module 330 may be an integral part of the software application 320. In some embodiments, the working content is generated by the software application 320 and the supplemental information is generated by the supplemental information module 330 based on the working content from the software application 320. In some embodiments, the supplemental information module 330 resides on the same machine as the software application 320. In some embodiments, the supplemental information module 330 may reside on a different machine than the software application 320.

The supplemental information module 330 may also be configured to cause a preview of one or more of the recommended modifications being applied to the working content to be displayed on the device within a preview layer positioned over the working content to which the modification(s) will be applied. In this fashion, the user 310 is able to preview the application of the recommended modification to the working content via preview layer before committing to the actual application of the recommended modification to the working content. In some embodiments, the preview layer comprises a semi-transparent window that may provide the visual effect of allowing the user to see the working content directly beneath the preview layer and a preview of how a recommended modification will be applied to the working content directly beneath the preview layer.

Upon viewing the preview of the application of the recommended modification, the user 310 may perform an action that indicates a desire to actually apply the recommended modification (e.g., clicking on a selectable push button that reads "Apply"). In some embodiments, the supplemental information module 330 may be configured to apply the recommended modification to the working content in response to the user action on the device. The supplemental information module 330 may also be configured to cause the applied recommended modification to the working content to be displayed on the device. The applied recommended modification to the working content may be displayed separately from the preview layer, thereby reflecting a distinction between the actual application of the recommended modification to the working content and the preview of the application of the recommended modification to the working content. The working content and any applied recommended modifications to the working content may be stored in the database(s) 340, which may be accessed by the software application 320 and/or the supplemental information module 330 for later retrieval, processing, and/or presentation to the user 310. In some embodiments, the database(s) 340 may be incorporated into the database(s) 130 in FIG. 1. However, it is contemplated that other configurations are also within the scope of the present disclosure.

In some embodiments, the supplemental information module 330 may be configured to cause a plurality of supplemental information items to be displayed to the user 310. Each one of the supplemental information items may comprise at least one additional detail related to the working content. In some embodiments, the supplemental information module 330 may be further configured to receive a user selection of one of the supplemental information items. For example, the user 310 may click on a particular supplemental information item in order to select it. It is contemplated that the user 310 may select one of the supplemental information items in other ways as well. In response to the selection of a supplemental information item, the preview layer may be displayed. The preview layer may comprise a recommended modification corresponding to the selected supplemental information item.

In some embodiments, the supplemental information module 330 may be further configured to receive a user selection of a portion of the working content. For example, the user 310 may click on a certain portion of a table of data. The supplemental information may be generated and displayed in response to the user selection, and the recommendation of the modification may be related to and/or based on the selected portion of the working content. In some embodiments, the user selection of the portion of the working content may be used to determine what supplemental information items to include in the plurality of supplemental information items. In some embodiments, the recommendation of the modification may be caused to be displayed within a panel positioned adjacent to the working content. However, it is contemplated that other presentation configurations of the recommendation of the modification are also within the scope of the present disclosure.

In some embodiments, the supplemental information module 330 may be further configured to cause the display of a history of modifications to the working content that resulted from applying a plurality of recommended modifications. For example, if three recommendations of modifications are presented to the user 310, and the user 310 performs actions to apply the three recommended modifications to the working content, then the supplemental information module 330 may generate and provide a history of these three recommended modifications so that the user 310 and other users may see what modifications were applied to the working content and when those modifications were applied. The history may comprise a timeline of the applied modifications.

In some embodiments, the supplemental information module 330 may also be configured to generate messages that include portions of the working content. The user 310 may select one or more portions of the working content to include in a message to another user. The user 310 may add text to the message before sending the message to the other user.

It is contemplated that the supplemental information module 330 may be configured to perform other functions as well, including, but not limited to, any of the features disclosed with respect to FIGS. 4A-4C, FIGS. 5A-5R, and FIG. 6. In some embodiments, the components and features of the supplemental information system 300 may be incorporated into or implemented using the components and features of system 100 in FIG. 1. For example, the software application 320 and/or the supplemental information module 330 may be incorporated into or implemented using the enterprise application platform 112 in FIG. 1. Other configurations are within the scope of the present disclosure.

Figure 4A:
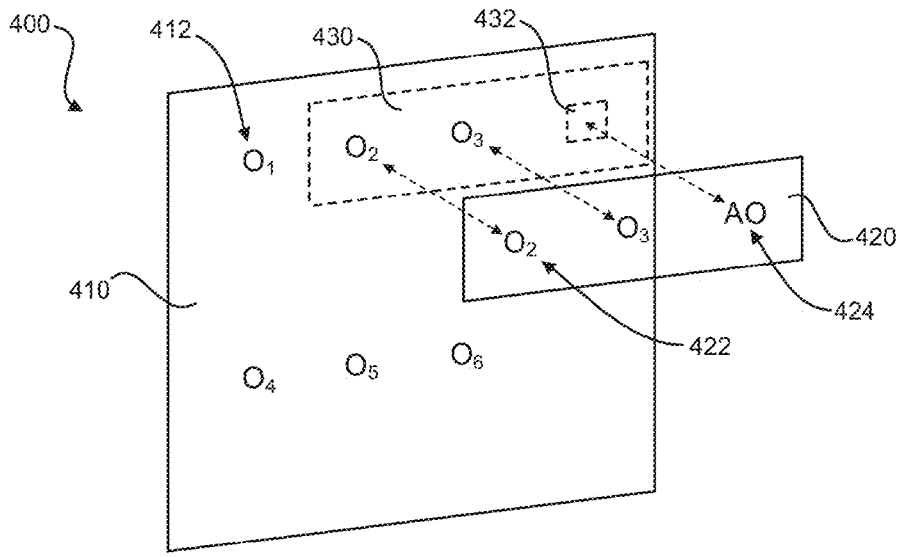
FIGS. 4A-4C illustrate a graphical user interface, in accordance with example embodiments.

In some embodiments, the working content and the supplemental information (e.g., recommended modifications) may be provided in the form of graphical objects. These graphical objects may comprise information in the form of alphabetical data, numerical data, and/or graphical data. It is contemplated that other forms of data are also within the scope of the present disclosure. FIG. 4A illustrates a perspective view of a user interface 400 providing working content and supplemental information in the form of graphical objects, in accordance with example embodiments. Working content may be displayed in a display zone 410 of the graphical user interface 400. The working content may comprise a plurality of graphical objects 412, such as graphical objects $O_1$, $O_2$, $O_3$, $O_4$, $O_5$, and $O_6$. In some embodiments, the working content may comprise a table of data or a chart of data. However, it is contemplated that other forms of working content are within the scope of the present disclosure.

A data overlay 420 may be displayed overlaying and at least partially obscuring a corresponding portion 430 (e.g., the portion within the dotted rectangular boundary) of the working content. The data overlay 420 may include unchanged graphical objects 422, such as $O_2$ and $O_3$, which may be aligned with and overlay corresponding graphical objects 412, such as O$_2$ and O$_3$, in the corresponding portion 430 of the working content. The data overlay 420 may also include at least one additional graphical object 424, such as additional graphical object AO. The additional graphical object(s) 424 may represent a modification to the corresponding portion 430 of the working content. This modification may comprise the addition of supplemental information to the working content. The additional graphical object(s) 424 may be aligned with a corresponding location 432 in the corresponding portion 430 of the working content. In some embodiments, the data overlay 420 may comprise a semi-transparent window. However, it is contemplated that other forms of the data overlay 420 are also within the scope of the present disclosure.

Figure 4B:
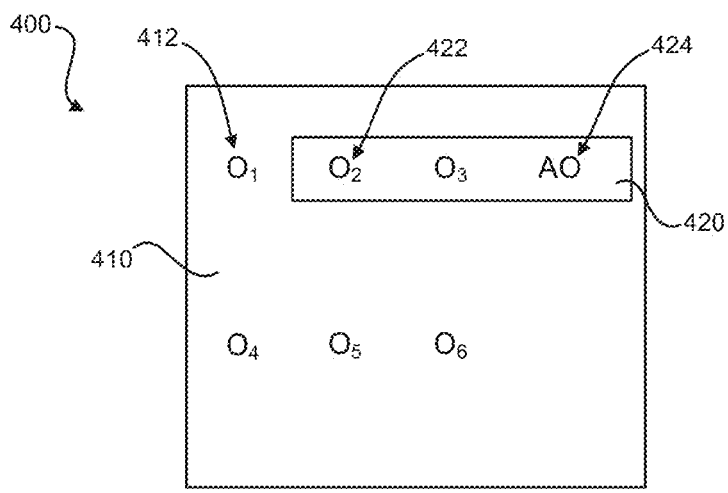

In some embodiments, when the additional graphical object 424 overlays the corresponding location 432 in the corresponding portion 430 of the working content, it may enable a user who is viewing the graphical user interface 400 to see how the additional graphical object 424 would look when incorporated in the that location of the working content, as seen in the plan view of the graphical user interface 400 in FIG. 4B.

Figure 4C:
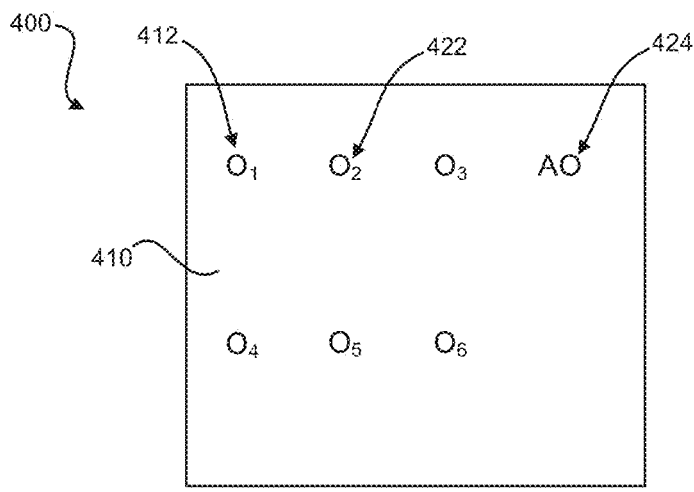

In some embodiments, the additional graphical object(s) 424 may be applied to the corresponding portion 430 of the working content in response to a user action on a device subsequent to the display of the data overlay 420 overlaying the corresponding portion 430 of the working content. The application of the additional graphical object(s) 424 to the corresponding portion 430 of the working content may then be displayed separately from the data overlay 420, as seen in FIG. 4C, and stored in a database.

In some embodiments, a plurality of supplemental information items may be displayed. Each one of the supplemental information items may comprise at least one additional detail related to the working content. In some embodiments, the data overlay may be displayed in response to receiving a user selection of one of the supplemental information items. The selected supplemental information item may correspond to the additional graphical object in the data overlay. In some embodiments, it may be determined what supplemental information items to include in the plurality of supplemental information items based on a user selection of a portion of the working content.

The features discussed above will be explained in further detail below with respect to FIGS. 5A-5R.

FIGS. 5A-5R illustrate a user interface, in accordance with example embodiments. In FIGS. 5A-5R, different stages of providing supplemental information for working content are shown. For the purposes of helping to explain some of the features of the present disclosure, an example scenario is described below, wherein a user 310 uses one example embodiment of a supplemental information system 300. Although details may be provided regarded the scenario, it is contemplated that other details are within the scope of the present disclosure. In some embodiments, the working content and the supplemental information (e.g., recommended modifications) may be provided in the form of graphical objects, as previously discussed with respect to FIGS. 4A-4C.

The user 310 may be a human resources administrator who collaborates on staffing matters with production supervisors. The user 310 has been hearing complaints from different project teams that perceive that a certain project, Project 1, has been using a disproportionate number of resources compared to other projects. These complaints are anecdotal and based on feeling. Additionally, every project manager has complained to the user 310 at one time or another that they are understaffed and will not complete all of their assignments within the planned time. Such complaints are typical. There is a large political component to the use of resources, where it is common for project supervisors to use anecdotes and lobbying as a means to gain more staff members.

Despite the fact that the user 310 may be very passive about finding quantitative answers to her general questions about this issue, there are many things that she can do to help answer her questions and address this issue, including, but not limited to: (a) mitigating the project supervisors' concerns about not reaching their targets by assessing the reality of the supervisors' perceptions; (b) justifying why Project 1 deserves more resources (e.g., because it is more complex, more strategic, etc.); (c) suggesting to her boss, if necessary, that the boss shift resources between projects; and (d) looking at projections. The user 310 has not thought about any activities using her existing analytics that would help her with such tasks.

In some embodiments, the user 310 may use a project management application that is enhanced with the supplemental information module 330. In FIG. 5A, a GUI 500 may display the user's use of the project management application. A menu bar 510 may be presented to provide the user 310 with information and selectable functional options. Working content 520 may be displayed on the device screen 500. In some embodiments, such as in FIG. 5A, the working content 520 may comprise one or more tables of data, although other forms of working content are within the scope of the present disclosure. As previously discussed, graphical objects may be used to display the working content. The user 310 may construct the working content 520 in order to perform her analysis based on data that she has collected from different sources (e.g., email, other people, spreadsheets, etc.). In FIG. 5A, the aggregate table of data may reflect how many people are working on each project. The table may comprise very limited descriptive statistics (e.g., totals by day, totals by week, and/or totals by project). The user 310 may open the file to remind herself of the latest staffing numbers. From this starting context, an indication may be provided to the user that there is supplemental information (e.g., recommendations or suggestions) available with automatic text summaries of the data. In FIG. 5A, an indication may be provided in the form of a flashing light bulb icon in the menu bar 510. However, it is contemplated that other forms of indications are within the scope of the present disclosure.

Figure 5B:
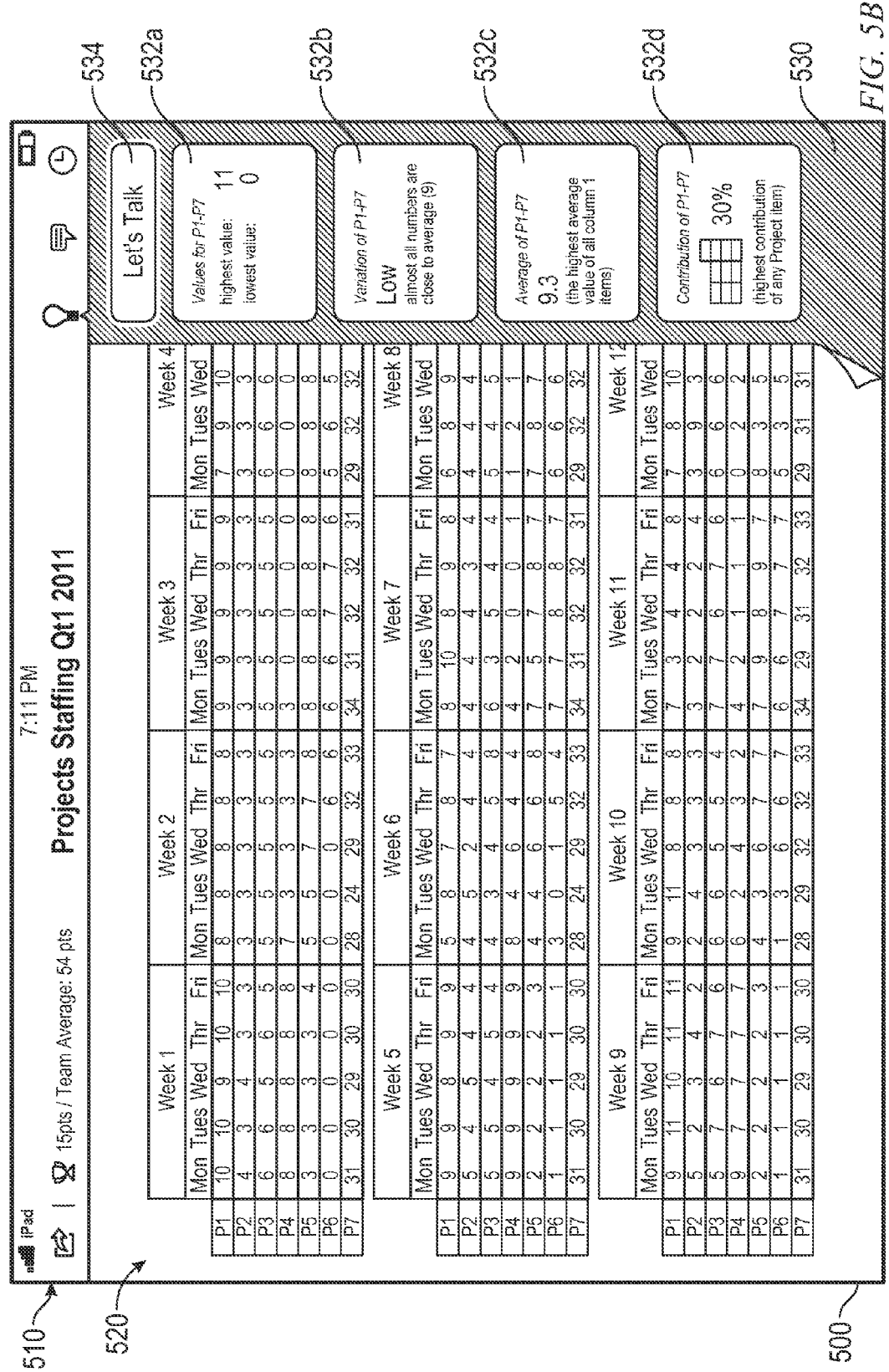
FIGS. 5A-5R illustrate a graphical user interface, in accordance with example embodiments.

In FIG. 5B, supplemental information may be presented to the user 310. In some embodiments, the supplemental information is presented in response to a user action (e.g., the user 310 clicking on the flashing light bulb). However, it is contemplated that the supplemental information may be presented to the user 310 without being initiated by a user action. In some embodiments, the supplemental information may be displayed within a panel 530 that is positioned adjacent to the working content 520. However, the supplemental information may be displayed in other ways as well.

The supplemental information module 330 may detect the context of the working content and generate supplemental information based on the detected context and the data of the working content. For example, in some embodiments, the supplemental information module 330 may recognize that the working content comprises a table, not a chart, and that it is a cross table, meaning that the intersection of rows and columns give specific meaning to the values at each intersection. If there were multiple measures, the supplemental information module 330 may also recognize the relationship of the multiple measures to the rows and column headers. In some embodiments, the supplemental information module 330 may recognize the relationships between a particular week (e.g., Week 1) and the days of the week (e.g., Monday through Friday). The supplemental information module 330 may recognize these headers as time dimensions. This recognition may be a result of a library of time descriptions added into the supplemental information system 300 in the most spoken/important languages worldwide. This library may enable the vast majority of possible references to years, quarters, months, days, and date formats to be automatically detected by the supplemental information module 330. This library of information may be stored in one or more databases (e.g., database(s) 340 in FIG. 3). In some embodiments, the supplemental information module 330 knows that the numbers in the table in the working content 520 are measures/values at the intersection of the row and column headings. However, in some embodiments, the supplemental information module 330 has no name for those values. In FIG. 5B, the values may be "Staffing" measures known by the supplemental information system 300. For this use case, we may assume that the value name is not known, which means that the suggestions refer to "values" instead of "staffing."

In some embodiments, the supplemental information module 330 may know that the descriptive statistics in the working content 520 are calculated as footers for columns or rows or embedded as subtotals within a table. Even without knowledge of the formula language, the supplemental information module 330 may detect descriptive statistics (e.g., sum, average, median, mode, high/low, running sum/average, ratios of cells/rows to totals, etc.).

The user 310 may have the details by staff member in another table, which may also include other attributes (e.g., whether the staff member is a full time employee or a temporary employee, as well as the agency a temporary staff member comes from. These related tables may share project names and times (e.g., week/days). The supplemental information module 330 may have no knowledge of other related content or users of similar content. In some cases, the supplemental information module 330 may discover this knowledge if the content is in the same repository, if the user 310 or other users have merged the data at other times, or if the related content is in the same file (e.g. tables in the same spreadsheet).

In some embodiments, the supplemental information system 300 may initially have no historical records of actions on this working content 520 from either the user 310 or any other users, but usage data may be gathered and used to generate and influence the supplemental information.

The supplemental information may comprise supplemental information items 532a-532d. Each supplemental information item 532a-532d may comprise at least one additional detail related to the working content. In some embodiments, each supplemental information item 532a-532d may correspond to a recommendation for a modification to the working content 520, as will be discussed in further detail later. In some embodiments, the supplemental information items 532a-532d may comprise tabs or cards. However, it is contemplated that other types of visual representations of the supplemental information items are also within the scope of the present disclosure.

Figure 5C:
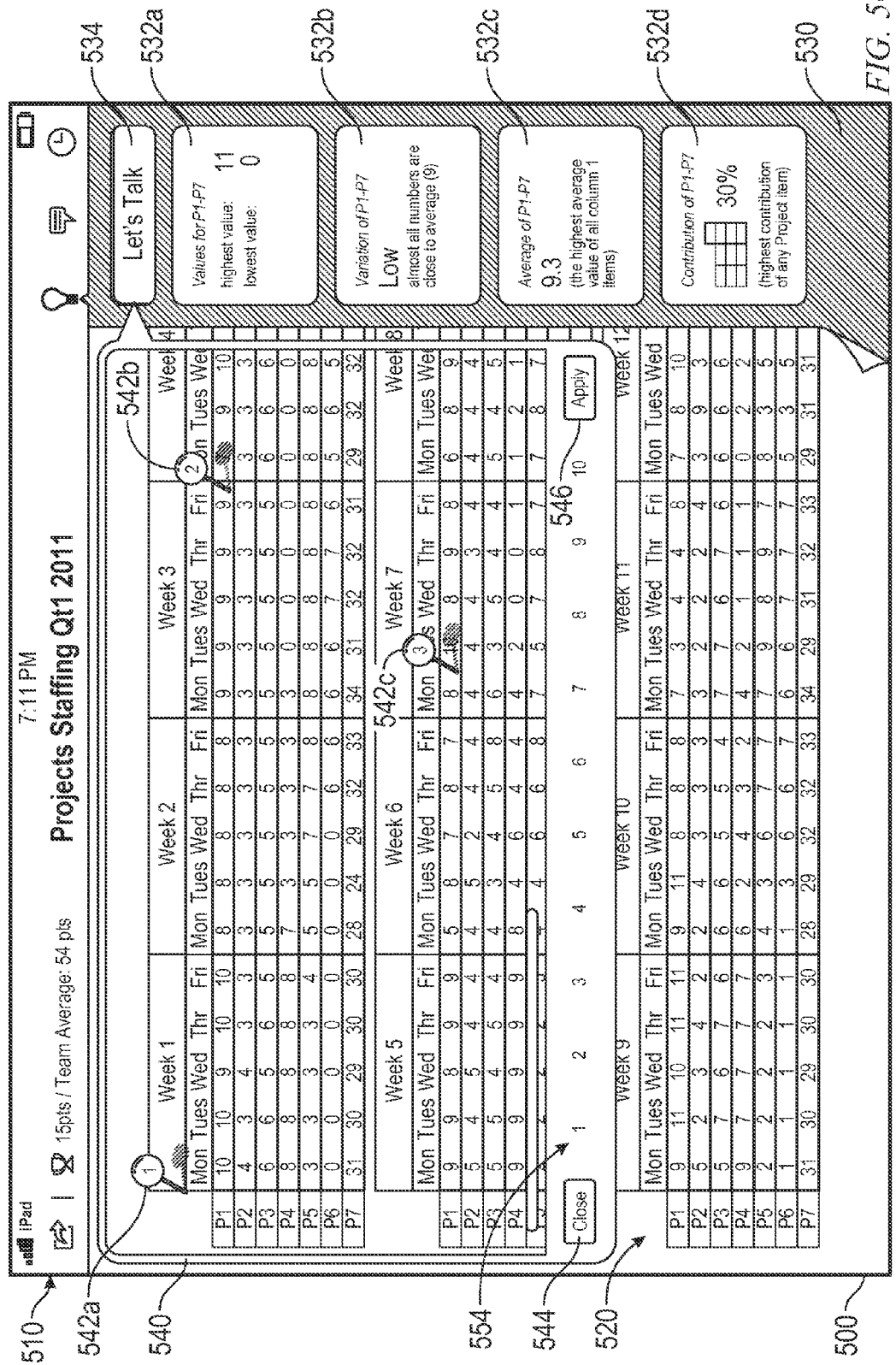

Although, only four supplemental information items 532a-532d are shown in FIG. 5C, it is contemplated that any number of supplemental information items may be provided and displayed. In some embodiments, the user 310 may scroll around (e.g., up, down, left, or right) the panel 530 to view additional supplemental information items that are currently out of view. The user 310 may select another button (e.g., a "Let's Talk" button 534) to be provided with other supplemental information. In FIG. 5C, the supplemental information module 330 may cause a preview layer 540 to be displayed over at least a portion of the working content 520. In some embodiments, the preview layer 540 may comprise a semi-transparent window. In some embodiments, the preview layer 540 may comprise one or more selectable points 542a, 542b, 542c positioned on the working content in different locations. In some embodiments, the selectable points 542a, 542b, 542c may be displayed as pushpins. However, other forms of selectable points are also within the scope of the present disclosure.

Figure 5D:
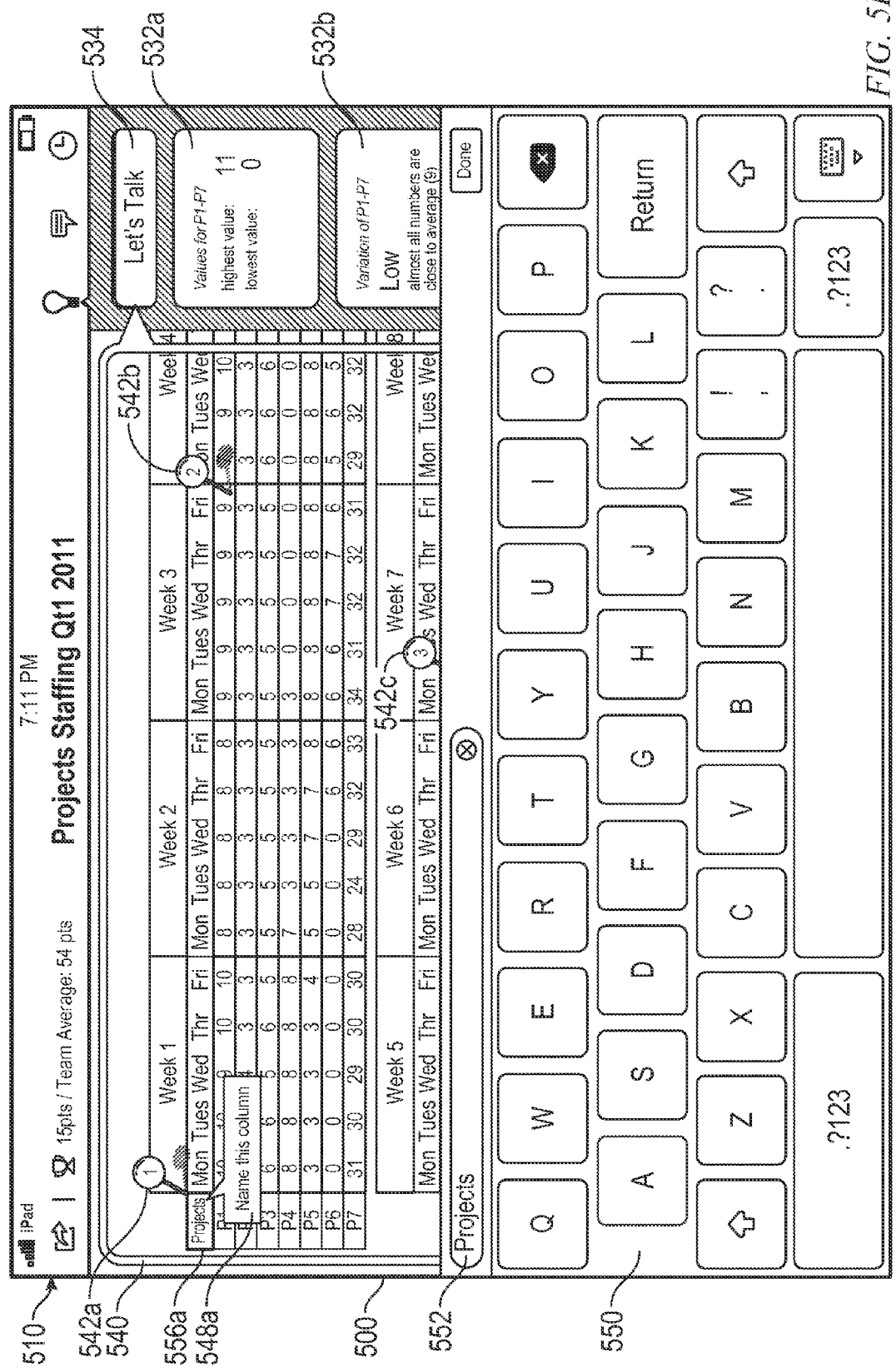

The user 310 may select one of the selectable points 542a, 542b, 542c. In FIG. 5D, the user 310 has selected the first selectable point 542a. As a result, the supplemental information module 330 may cause a field 556a to be displayed in a fashion appears as if it cuts through the preview layer 540 to the table of the working content 520. The field 556a may be accompanied by a callout 548a. The callout 548a may comprise a description of a suggested action (e.g., "Name this column"). The user 310 may realize that she is being prompted to provide information about her dataset and that her answers may improve the precision and relevance of the suggestions that the supplemental information module 330 may provide. Initially, the user 310 may not have named a column of the table that contains project names P1, P2, etc. Since the supplemental information module 330 may use this information to understand the working content 520 better, the user 310 may follow the prompting (e.g., an instruction or request) and enter a name of the column directly into the table via the semi-transparent window 540. In some embodiments, the user 310 may enter a name for the column into the field 556a using user input mechanisms. For example, the user 310 may enter the name using a touchscreen keyboard 550 and an input field 552. Other input mechanisms are also within the scope of the present disclosure. In FIG. 5D, the user 310 enters the name "Projects" for the column. As a result, in FIG. 5E, the field 556a in the table reflects the naming of the column as "Projects."

At this point in the scenario, the user 310 has not yet indicated the measure that she has used for the values in the dataset of the working content 520. While it may be clear to the user 310 that the values are staff members assigned to a particular project, it is not necessarily clear to others or to the supplemental information module 330. The user 310 may select a second selectable point 542b and be prompted to enter a name for certain values in the working content by a callout 548b comprising a description of a suggested action (e.g., "Name these numbers"). The user 310 may enter a name for these values using the touchscreen keyboard 550 and the input field 552, or by using other user input mechanisms.

While the user 310 provides requested information, consequentially, the selectable points that were pointing to the promptings that were addressed by the user 310 may disappear. For example, in FIG. 5F, since the user has addressed the promptings of the first and second selectable points 542a and 542b, respectively, these selectable points 542a and 542b may disappear and no longer be displayed.

Figure 5F:
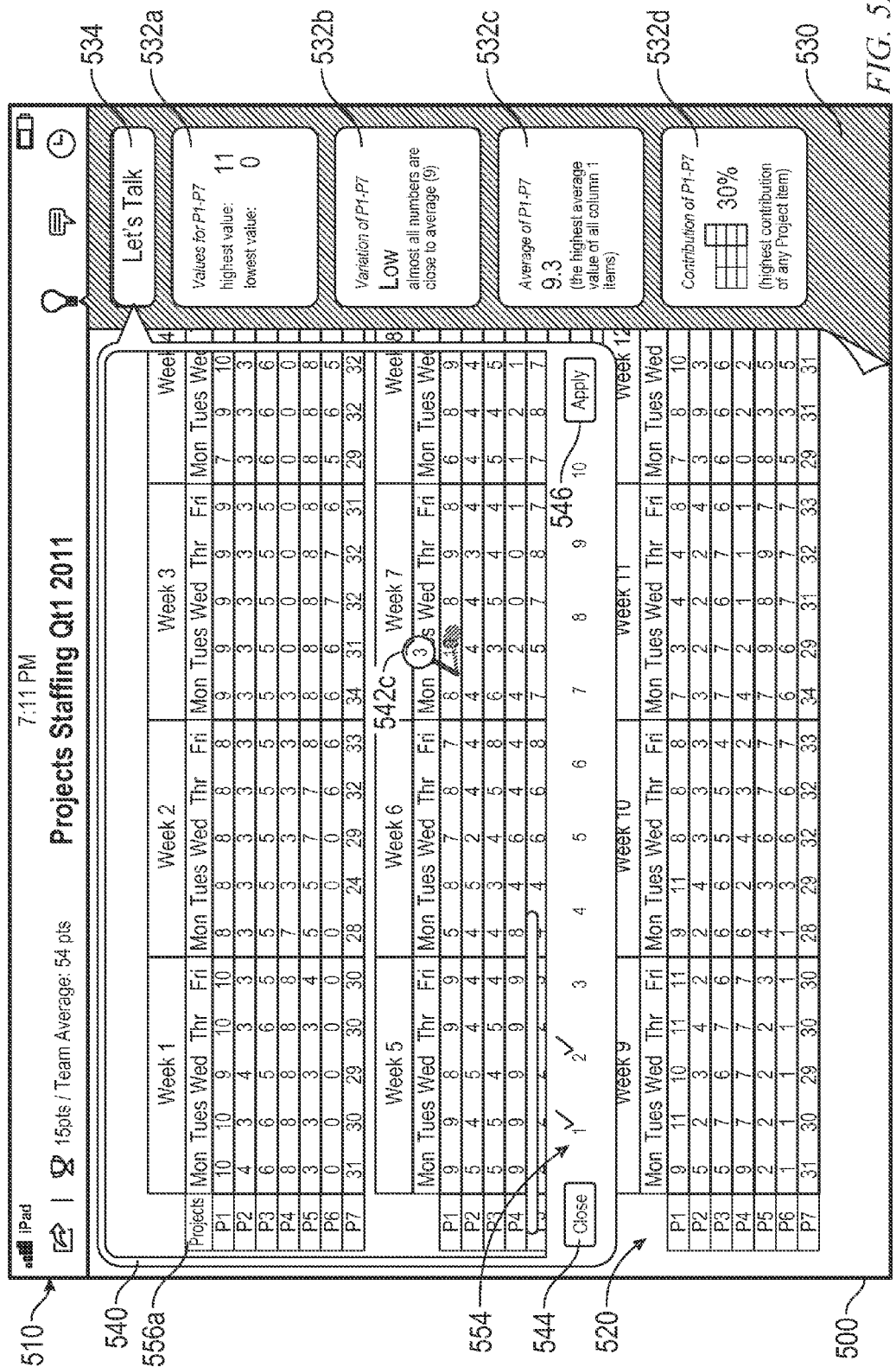

The supplemental information module 330 may also provide a navigational control at the bottom, or some other location, of the preview layer 540 with numbers 554 (e.g., 1, 2, 3, . . . ) that correspond to identifiers (e.g., 1, 2, 3, . . . ) of the selectable points 542a, 542b, 542c. This navigational control may provide a scalable solution when the supplemental information module 330 has more promptings or questions than it could display in the visible area of the semi-transparent window 540. Selecting one of the numbers 554 (e.g., by clicking or tapping) may move the part of the working content (e.g., the table) associated with the corresponding selectable point to a visible area of the semi-transparent window 540, thereby enabling the user 310 to view the prompting or question of the corresponding selectable point, and to provide requested information. In some embodiments, the supplemental information module 330 may cause a visual indication of a selectable point having already been addressed to be displayed. For example, the numbers 554 referring to already answered promptings or questions may have a check mark displayed next to them, as shown in FIG. 5F. Other visual indications of a selectable point having already been addressed may be used as well.

After the user 310 has addressed some or all of the promptings or questions of the selectable points (e.g., by entering the requested information), the supplemental information module 330 may use the information provided by the user 310 to modify the content of the supplemental information items 532*a*-532*d*. For example, the content of the supplemental information items 532*a*-532*d* may be modified to reflect the user's labeling of the table column comprising P1-P7 as "Projects," as seen in the suggestion cards 532*a*-532*d* in FIG. 5G.

Figure 5G:
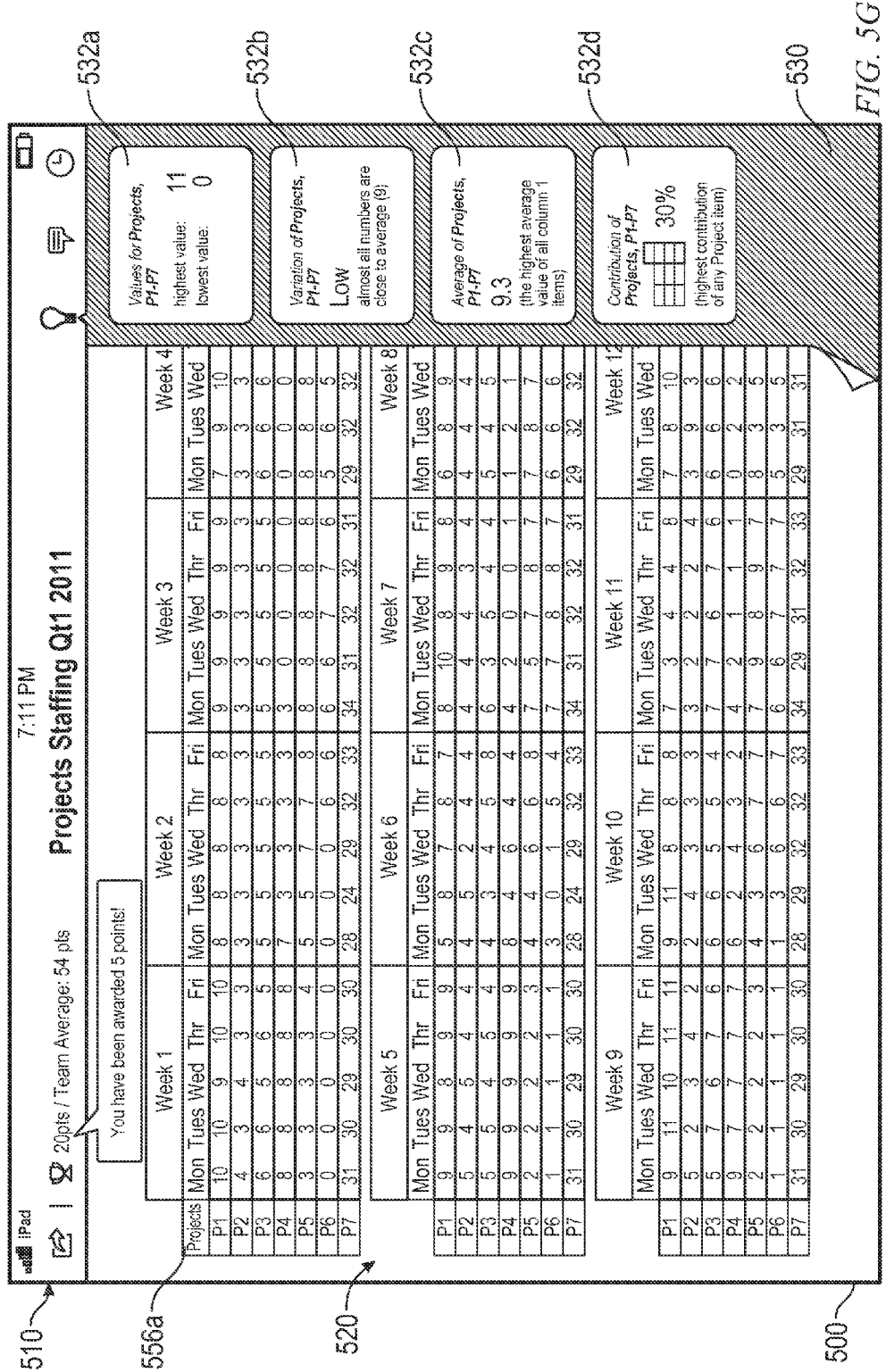

Additionally, the supplemental information module 330 may reward the user 310 for being responsive to the promptings or questions by awarding the user 310 points, which may be represented in the menu bar 510 with a point total for the user 310 (e.g., 20 points in FIG. 5G) and a statement of how many points the user 310 has been awarded for his or her most recent response (e.g., "You have been awarded 5 points!" in FIG. 5G). The user's point total may be stored in a database and used by other people (e.g., the user's superior) to determine how active and responsive the user 310 has been.

Figure 5H:
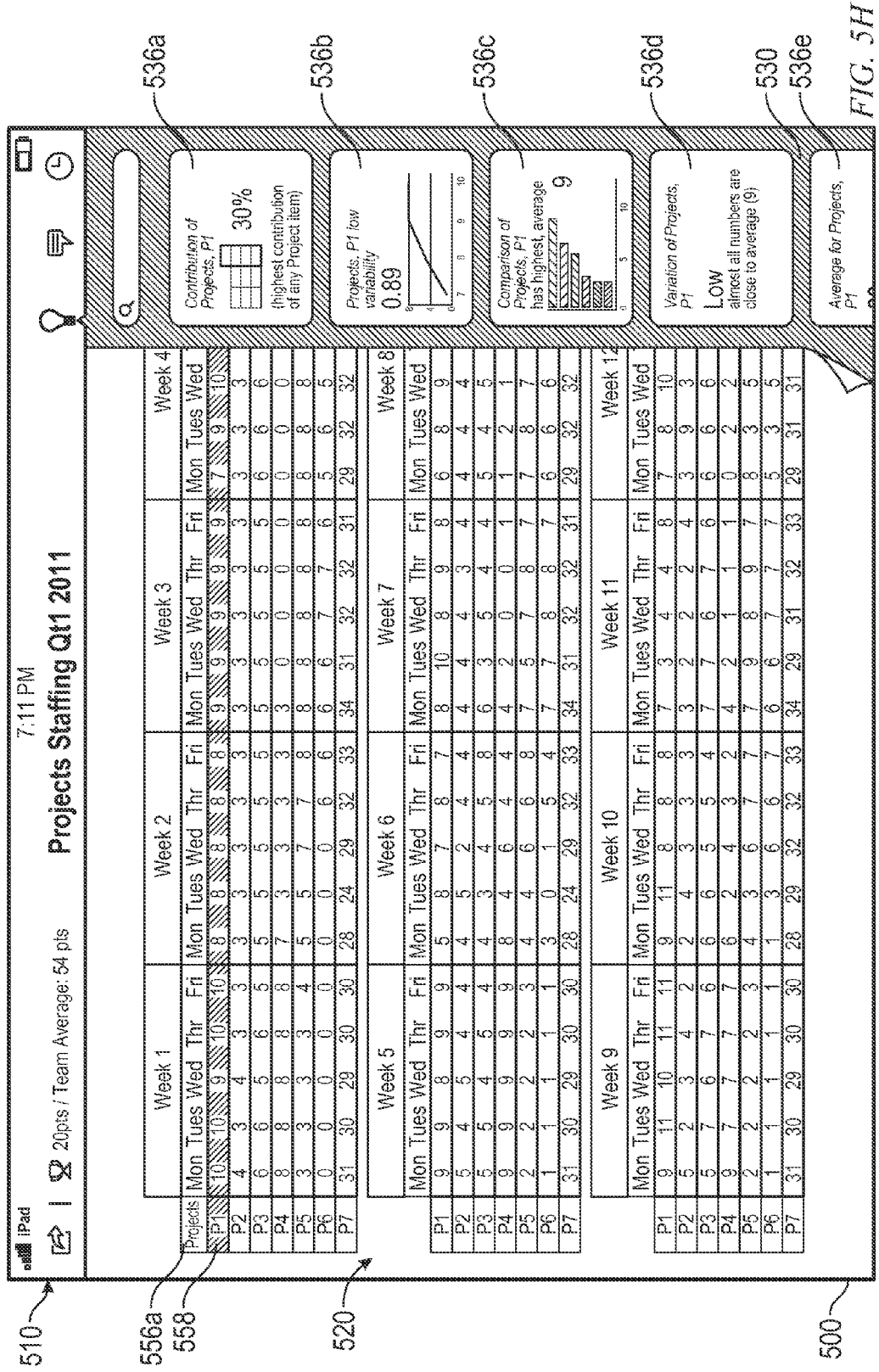

The user 310 may select a portion of the working content 520. For example, as seen in FIG. 5H, the user 310 may select a row 558 of the table. The supplemental information module 330 may respond to the selection by modifying the supplemental information provided based on the selection. For example, as seen in FIG. 5H, the supplemental information module 330 may cause supplemental information items 536*a*-536*e* that are relevant to the selected row 558 to be displayed. In this respect, the user's selection may be used to determine the supplemental information items 536*a*-536*e*. Since the selected row 558 in FIG. 5H corresponds to Project 1 (P1), the supplemental information items 536*a*-536*e* may be relevant to Project 1 (P1). Other types of selections are also within the scope of the present disclosure. Although, only five supplemental information items 536*a*-536*e* are shown in FIG. 5H, it is contemplated that any number of supplemental information items may be provided and displayed. In some embodiments, the user 310 may scroll around (e.g., up, down, left, or right) the panel 530 to view additional supplemental information items that are currently out of view.

Figure 5I:
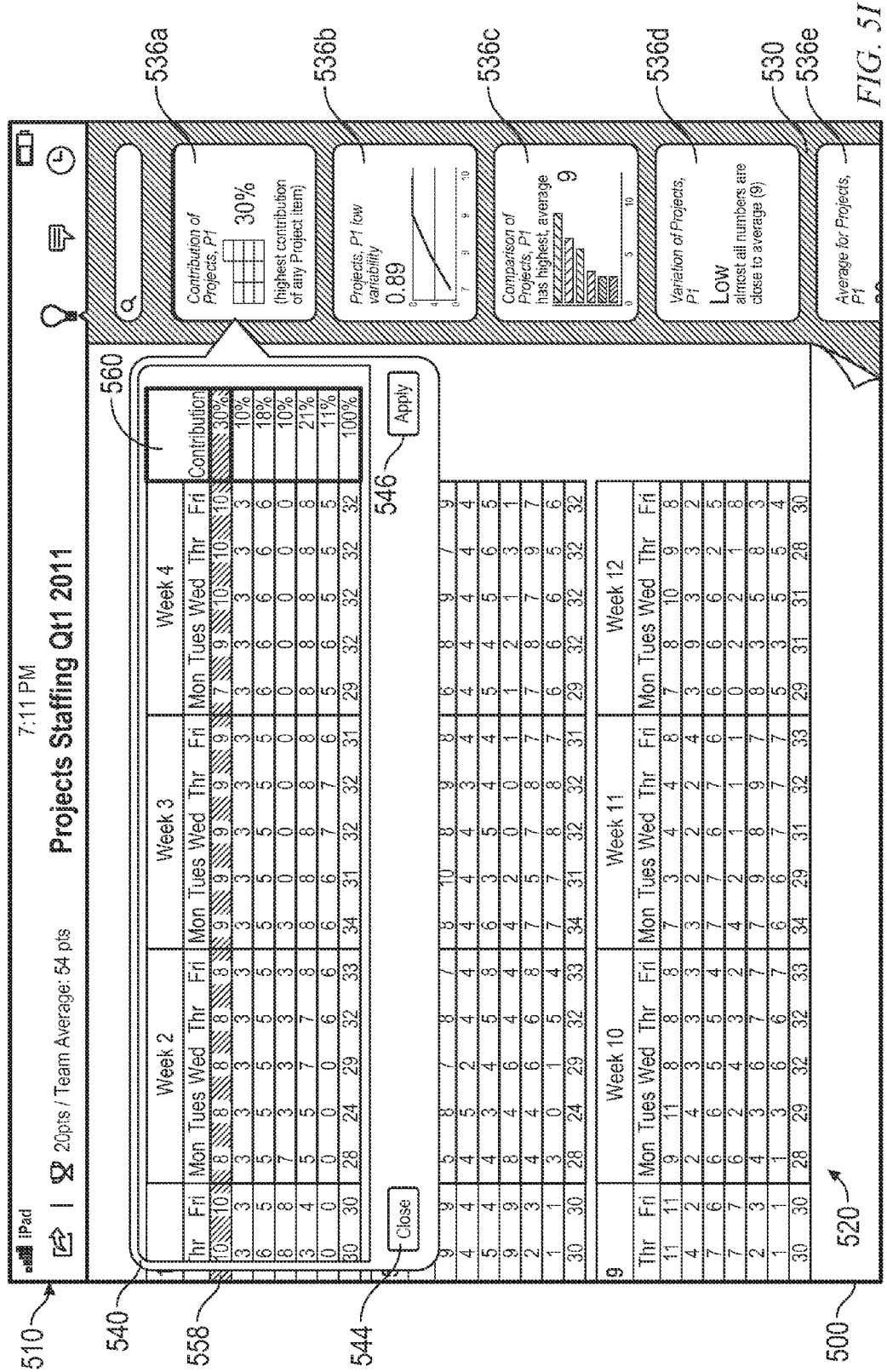

In some embodiments, the user 310 may notice and select a supplemental information item that provides information of interest to him or her. In some embodiments, the information on the supplemental information item may comprise a recommendation for a modification to the working content. Selection of the supplemental information item may cause a preview of the corresponding recommended modification to the working content to be displayed within the preview layer 540. The user 310 may apply and commit to the recommended modification to the working content. For example, the user 310 may notice that supplemental information item 536*a* provides information about the contribution of Project 1 (P1). Interested in this information, the user may select supplemental information item 536*a*, as seen in FIG. 5I, which may cause the preview layer 540 to be displayed. Within the preview layer 540, the supplemental information module 330 may cause a preview of a new column 560 reflecting the contribution of project values per project being added to the table to be displayed. The preview layer 540 may show this new column 560 that could be added to the table upon the user's instruction to do so. In some embodiments, the user 310 may choose to apply this recommended modification by selecting a push button 546 that indicates that the recommended modification will be applied. It is contemplated that other mechanisms may be used to enable the user 310 to choose to apply the recommended modification. The user 310 may also choose not to apply the recommended modification, and may simply close the preview layer 540 previewing the recommended modification, such as by selecting a push button 544 indicating that the preview layer 540 will be closed without applying the recommended modification or by some other mechanism.

Figure 5J:
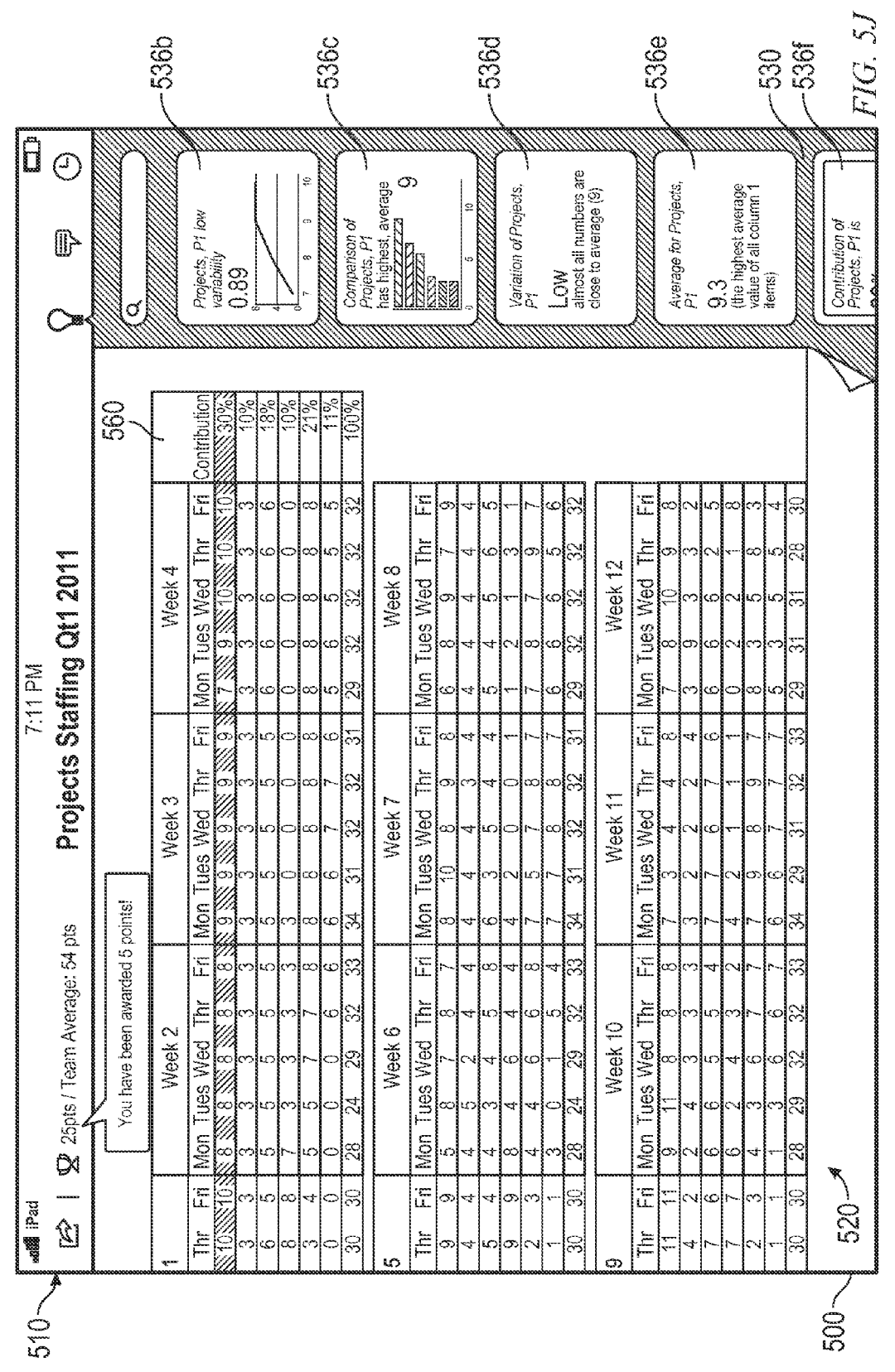

As a result of applying the recommended modification, the preview layer 540 may be removed from display and the recommended modification may be reflected in the working content 520, as shown in FIG. 5J with the new column 560 being added to the table. In some embodiments, the supplemental information module 330 may reward the user 310 for applying the recommended modification. As previously discussed, this reward may be represented in the menu bar 510 with a point total for the user 310.

Additionally, in some embodiments, once a recommended modification has been applied, the corresponding supplemental information item may be removed from display. For example, since the recommended modification of adding new column 560 to the table has been applied in FIG. 5J, the corresponding supplemental information item 536*a* may no longer be displayed. In some embodiments, as a result of a supplemental information item being removed from display, another supplemental information item that was previously wholly or partially out of view may become more visible to the user 310. For example, in FIG. 5J, the removal of supplemental information item 536*a* may enable supplemental information item 536*e* to go from being partially displayed to being completely displayed, and may enable supplemental information item 536*f* to go from being not displayed at all to being partially displayed.

Figure 5K:
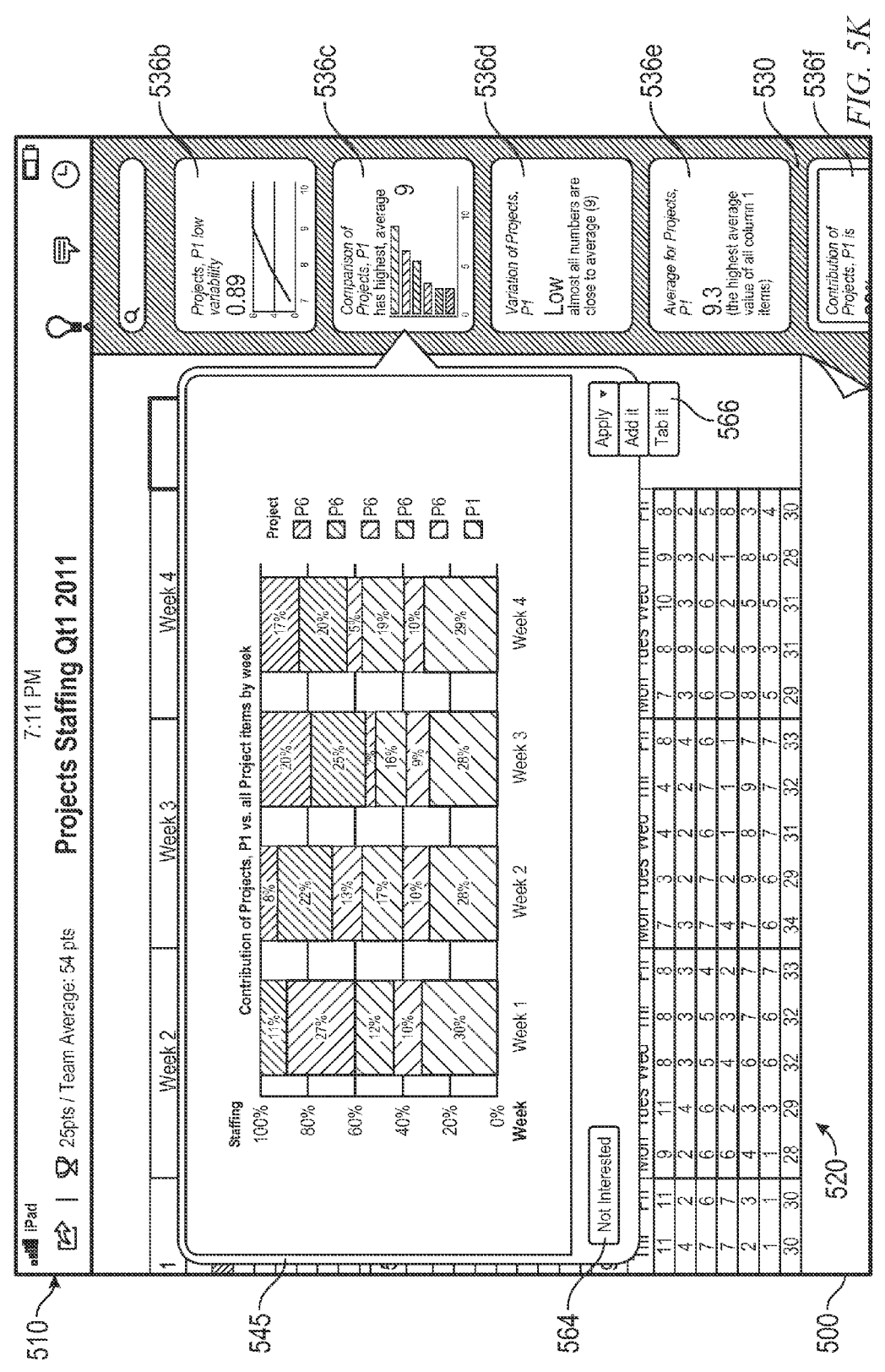

In FIG. 5K, the user 310 may select supplemental information item 536*c*, which comprises a suggestion to provide an analysis of the contribution of projects with data visualization, comparing the values of each project for each week. The supplemental information module 330 may provide a recommendation to incorporate a chart into the working content 520. A preview of this recommended modification may be displayed in a preview layer 545. The chart may facilitate a comparison of contribution across time (e.g., week) and dimension (e.g., project). The Project 1 (P1) segment in each bar may be uniquely formatted as a result of the user's selection of the Project 1 (P1) row in FIG. 5H and the resulting applied modification. This derived context of the selection of the Project 1 (P1) row may be carried over to the data visualization in FIG. 5K. In some embodiments, the supplemental information module 330 may enable the user 310 to change the title of the chart, as well as other chart parameters.

It is contemplated that there may be different ways of applying the recommended modification (e.g., adding the chart to the working content). In some embodiments, the content of the recommended modification (e.g., the chart) may be added to the current existing view (e.g., the working content currently being displayed). In some embodiments, a new tab or view may be created and the content of the recommended modification may be displayed in that new tab or view. The user 310 may choose a way to apply the recommended modification by using a drop down menu 566 with selectable options. It is contemplated that other mechanisms may be used to enable the user 310 to choose a way to apply the recommended modification. The user 310 may also choose to not apply the recommended modification, such as by selecting a push button 564 that indicates that the recommended modification will not be applied, or by using another mechanism.

Figure 5L:
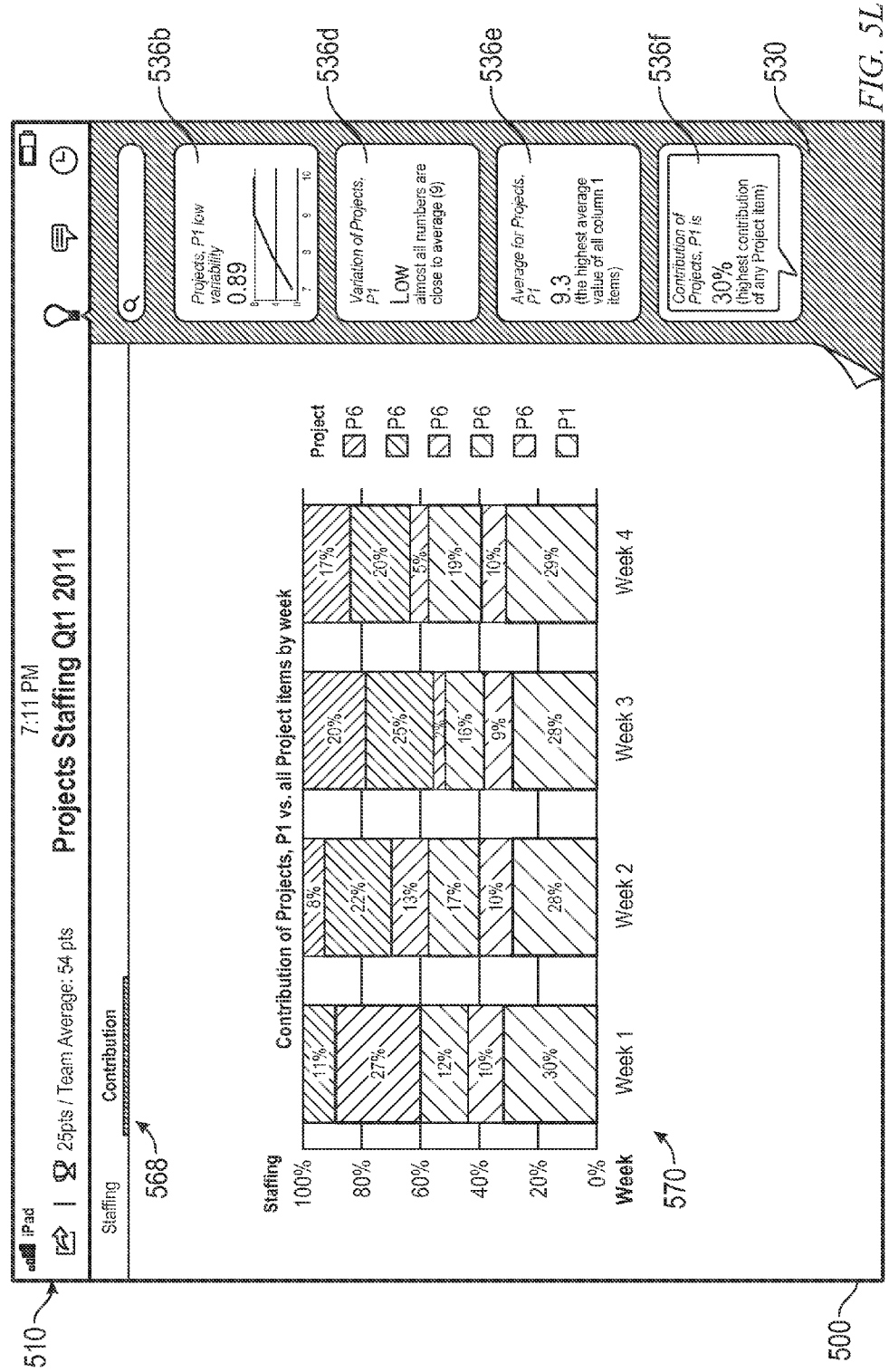

In FIG. 5L, a new tab 568 has been created, thereby displaying the chart 570 in a different tab as the other working content 520. When the contribution of projects is broken down week by week, the user 310 may see that Project 1 (P1) has the largest staffing in any given week.

Figure 5M:
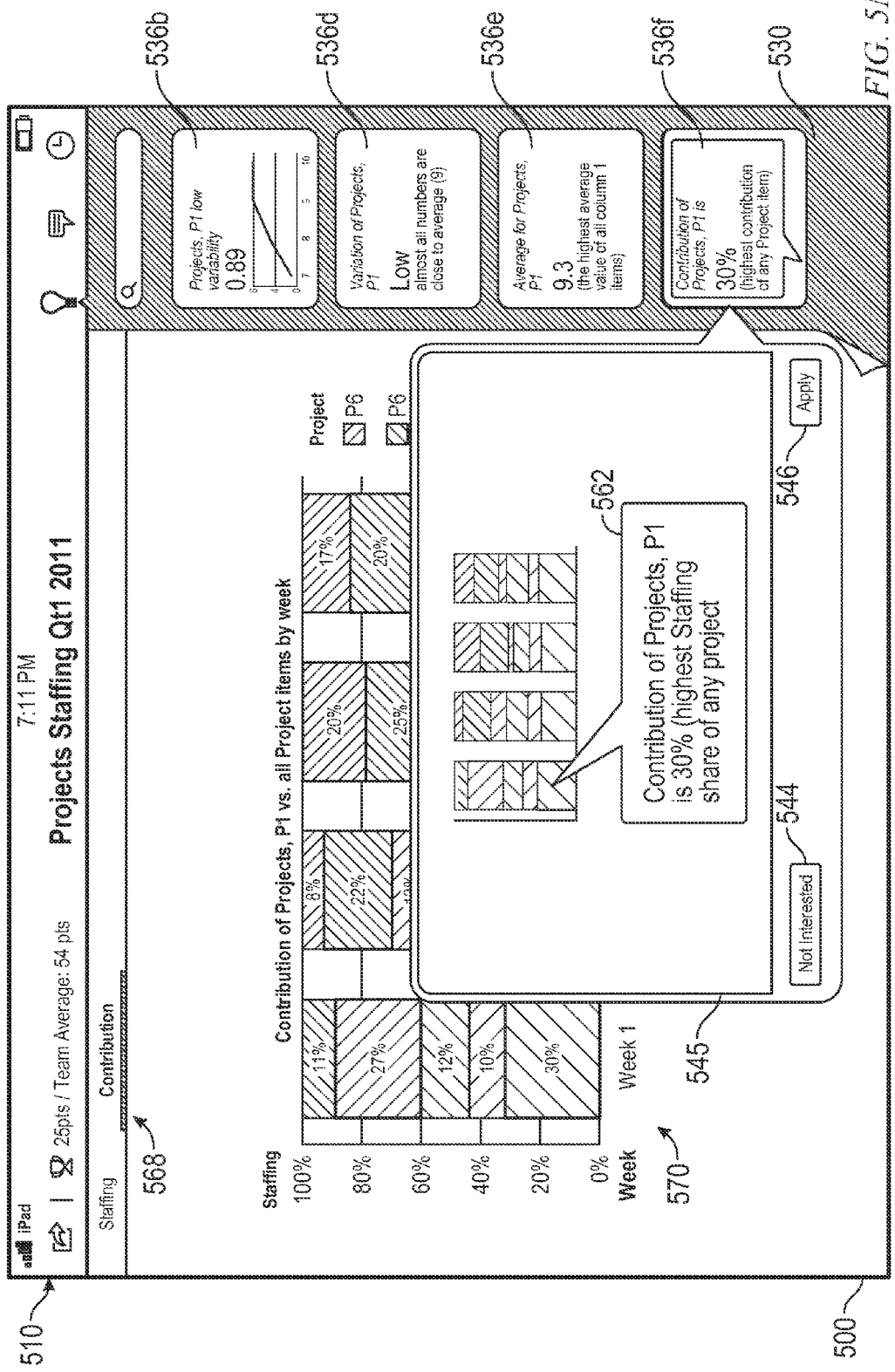
Figure 5N:
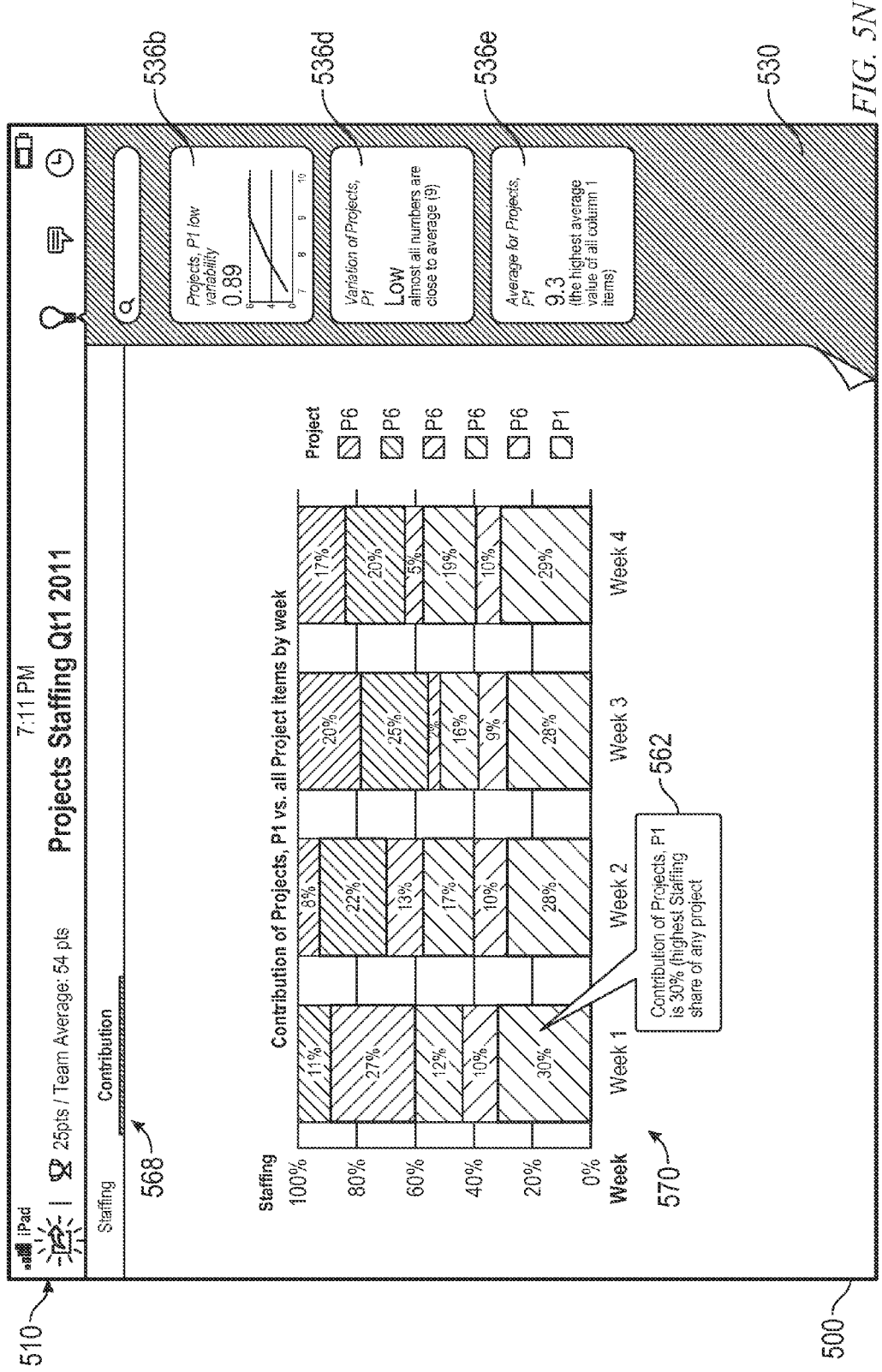

The user 310 may be interested in other supplemental information items. In FIG. 5M, the user 310 may be interested in and select supplemental information item 536f. When displayed in window 545, the preview of the recommendation of supplemental information item 536f shows a textual callout 562 in the working content. The user 310 may choose to apply the recommended modification or not apply the recommended modification. The textual callout 562 may express that Project 1 (P1) as the highest Staffing share of any project with 30%. The user 310 may think to herself that now she has some numbers to back up her communication to her manager that Project 1 (P1) is hogging the staffing resources. In FIG. 5N, the recommended modification of adding the textual callout 562 to the chart 570 has been applied. This is an example of how quantitative information may be transformed by the supplemental information module 330 into a qualitative statement.

Figure 5O:
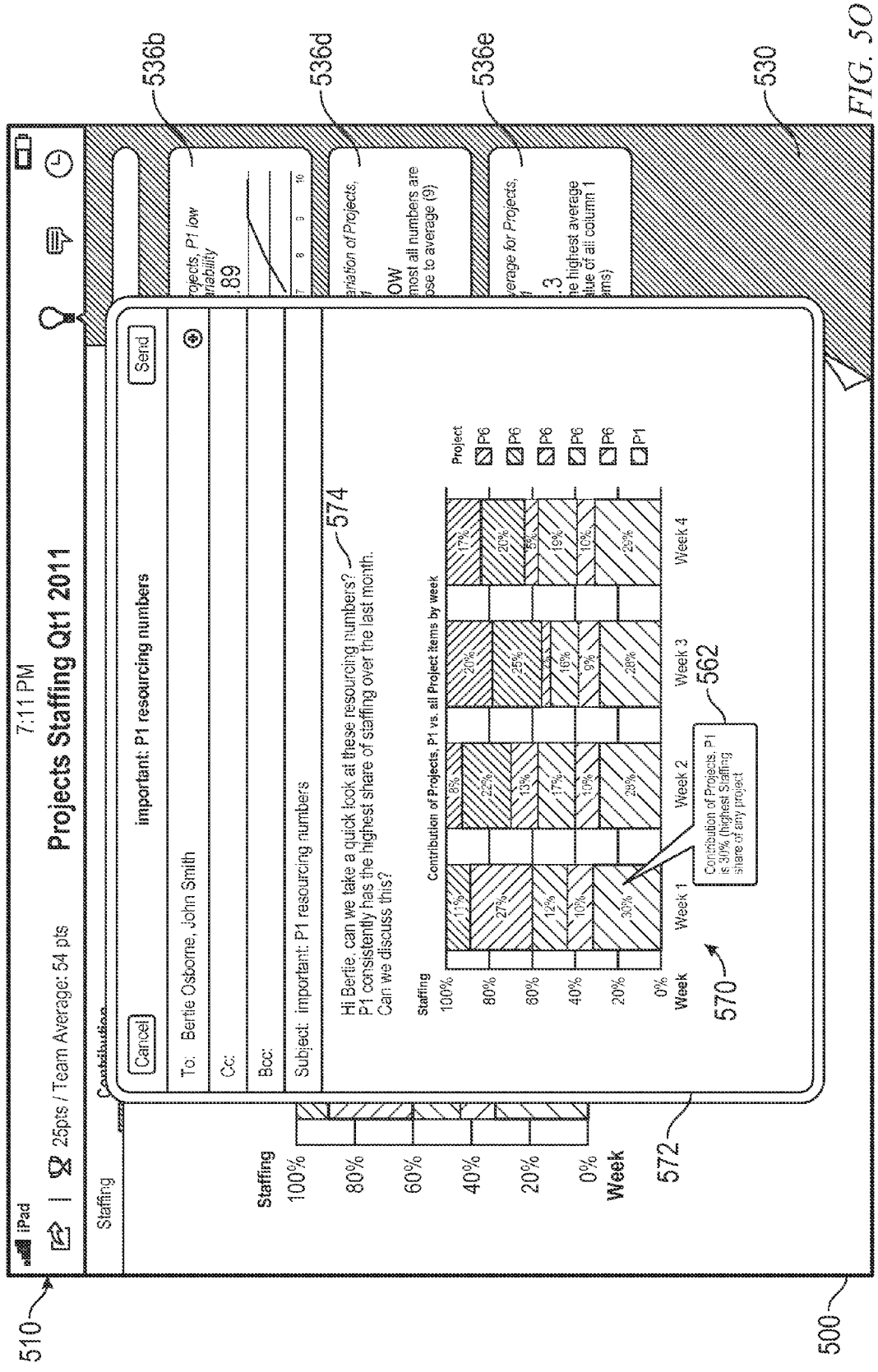

The user 310 may want to involve another user in this process. For example, the user 310 may want to involve the Project 1 (P1) product manager (e.g., Bertie in FIG. 5O) to let him know what she has learned and to see if he has any thoughts. The user 310 may initiate a discussion with one or more other users. In some embodiments, the user 310 may initiate the discussion by selecting an icon. It is contemplated that other mechanisms of initiating the discussion may be employed as well. Upon initiation of the discussion, a message may be created in the form of an opened discussion overlay 572. Some or all of the working content may be captured and placed in the message. For example, the chart 570 and the callout 562 may be captured and placed in the opened discussion overlay 572. The captured portion of the working content may be a snapshot of data of the working content. The supplemental information module 330 may detect potential recipients for the data at issue and automatically include those recipients in the discussion by addressing the message to their e-mail addresses when the message is created. The user 310 may add text 574 to the message. This text 574 may include an explanation of the data and/or a question about the data. The message may then be sent to the intended recipients.

The supplemental information module 330 may provide a discussion history for a particular dataset or a particular user. For example, the user 310 may select a discussion icon in the menu bar 510 and be presented with a history of discussions 576a-576e, as seen in FIG. 5P. Although FIG. 5P only shows five discussions 576a-576e, any number of discussions may be provided. These discussions 576a-576e may be organized by the dataset to which they apply, the users involved, or by other organizational methods as well. Representations of the discussions 576a-576e may be displayed in the panel 530. The discussions 576a-576e may be displayed in response to an icon in the menu bar 510 representing a discussion history being selected by the user 310. The user 310 may then view the details of a particular discussion thread by selecting a particular discussion. For example, the user 310 may select discussion 576a, causing a window 578 to open up. The window 578 may comprise all of the back-and-forth messages for the discussion 576a.

Figure 5Q:
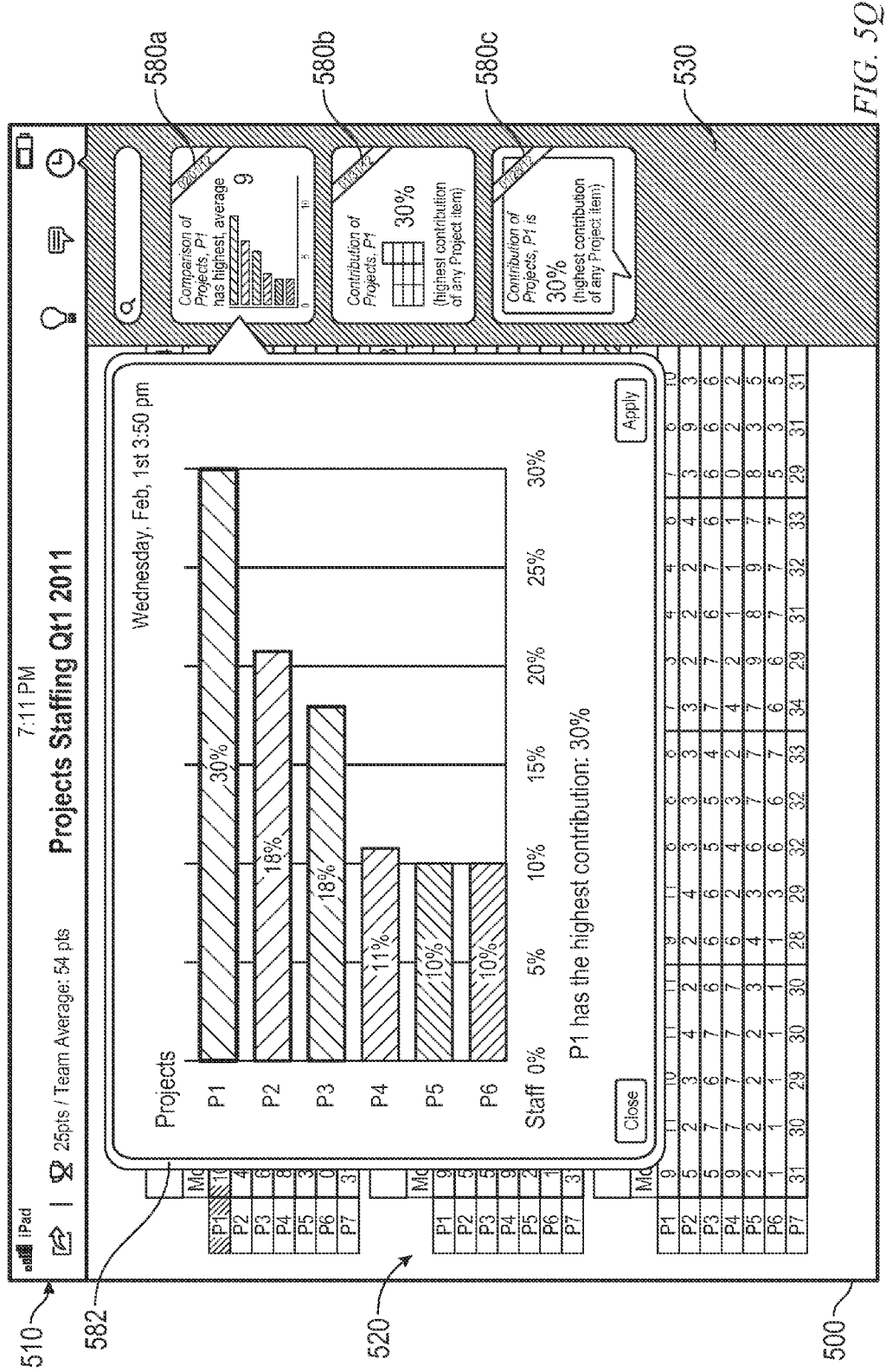

The supplemental information module 330 may also provide the user 310 with a history of the recommended modifications that were made to the working content 520. As seen in FIG. 5Q, representations of the recommended modifications 580a-580c that were made to the working content 520 may be displayed in the panel 530. These representations 580a-580c may comprise information about when the corresponding modification was applied to the working content. For example, the representations 580a-580c may comprise the dates on which their corresponding modifications were made. The user 310 may select one of the representations 580a-580c. As a result, a window 582 may open up, displaying more detailed information about the corresponding modification. The presentation of the history of the recommended modifications that were applied to the working content 520 may enable the user 310 to view the development of the working content 520 and the applied recommendations.

In some embodiments, the supplemental information module 330 may provide a gallery that shows the categories of the different recommendations that is has made. The user 310 may navigate his or her way to the gallery in a variety of ways (e.g., selecting a link that opens the gallery). FIG. 5R illustrates one example of a gallery 584 that shows the categories 586a-586c of the different recommendations that have been made. Each category may be placed on a band that may be scrolled independently.

Category 586a may correspond to recommendations that were related to methods. These methods may include, but are not limited to, aggregation or basic descriptive statistics (e.g., sum, average, counts, median, min/max, filters by different dimensions) that may be applied to rows and/or columns of a dataset and different levels of aggregates, ranking/contribution (e.g., ranking of selection, ranking of selection versus ranking of other groupings, contribution of selection versus contribution of total, contribution of selection versus contribution of other inherent groupings) that may be applied to rows and/or columns of a dataset, and variability and distribution (e.g., min/max within a selection, counts, binning of counts, outliers or "interesting values") that may be applied to rows and/or columns of a dataset.

Category 586b may correspond to recommendations that were related to related information or extended data, which may include, but is not limited to, related charts, related tables, related collections of tables and charts in documents, related text documents that include a keyword that matches a dimension of a table in the working content, new levels of aggregation (e.g., down one level or up one level), and replacement data (e.g., swapping measurements, such as using profit instead of revenue, and replacement dimensions, such as using sales person instead of products in an analysis showing sales).

Category 586c may correspond to recommendations that were related to a social network of people who are or have been interacting with the same or similar working content.

It is contemplated that other categories are within the scope of the present disclosure as well. Additionally, a search field 588 may be provided to allow the user 310 to search for recommendations.

Figure 6:
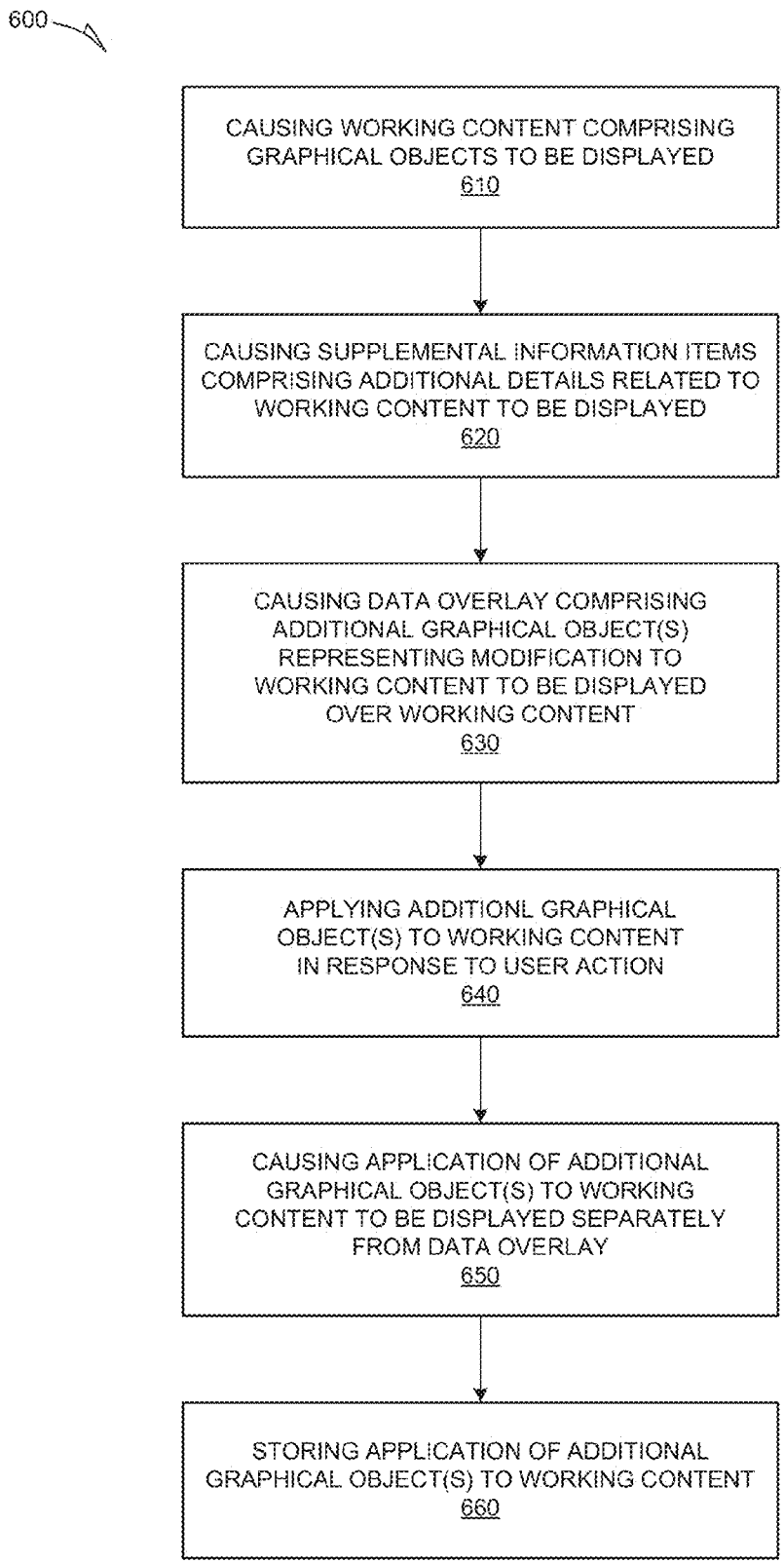
FIG. 6 is a flowchart illustrating a method of providing supplemental information, in accordance with an example embodiment.

FIG. 6 is a flowchart illustrating a method 600 of providing supplemental information, in accordance with an example embodiment. At operation 610, working content may be caused to be displayed in a display zone of a graphical user interface of a device. The working content may comprise a plurality of graphical objects. At operation 620, supplemental information items may be caused to be displayed on the device. Each one of the supplemental information items may comprise at least one additional detail related to the working content. At operation 630, a data overlay may be caused to be displayed overlaying and at least partially obscuring a corresponding portion of the working content. The data overlay may include unchanged graphical objects, which may be aligned with and overlay corresponding graphical objects in the corresponding portion of the working content. The data overlay may also include at least one additional graphical object. The additional graphical object(s) may represent a modification to the corresponding portion of the working content. This modification may comprise the addition of supplemental information to the working content. In some embodiments, the data overlay may comprise a semi-transparent window. However, it is contemplated that other forms of the data overlay are also within the scope of the present disclosure. At operation 640, the additional graphical object(s) may be applied to the corresponding portion of the working content in response to a user action on the device indicating a desire to apply the additional graphical object(s) to the working content. At operation 650, the application of the additional graphical object(s) to the corresponding portion of the working content may be caused to be displayed on the device separately from the data overlay (e.g., not within the data overlay). At operation 660, the application of the additional graphical object(s) to the corresponding portion of the working content may be stored in a database. It is contemplated that any of the other features described within the present disclosure may be incorporated into method 600. Furthermore, it is contemplated that the operations of method 600 may be performed by a system or modules of a system (e.g., supplemental information module 330 in FIG. 3).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
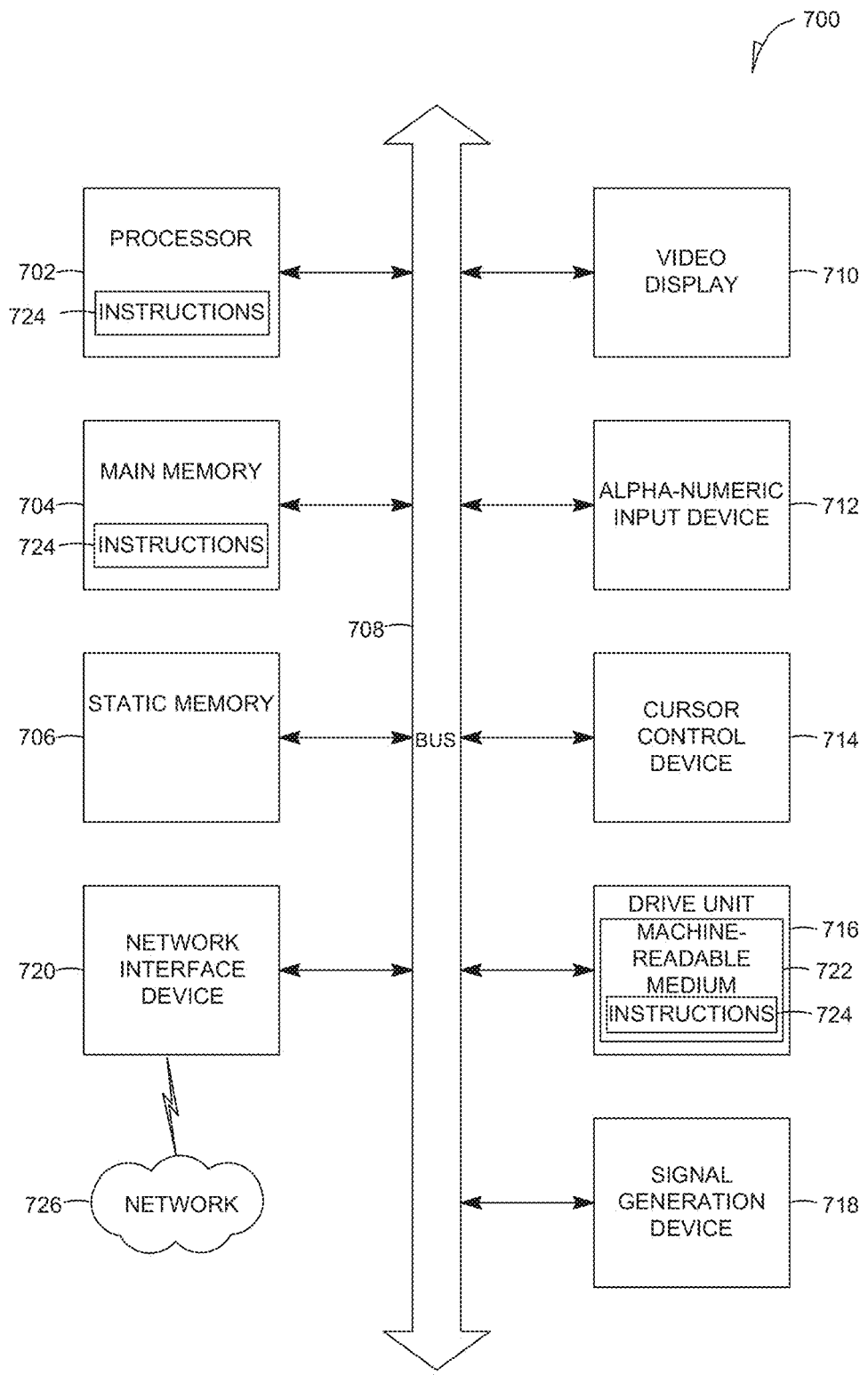
FIG. 7 is a block diagram of an example computer system on which methodologies described herein may be executed, in accordance with an example embodiment.

FIG. 7 is a block diagram of a machine in the example form of a computer system 700 within which instructions 724 for causing the machine to perform any one or more of the methodologies discussed herein may be executed, in accordance with an example embodiment. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation (or cursor control) device 714 (e.g., a mouse), a disk drive unit 716, a signal generation device 718 (e.g., a speaker) and a network interface device 720.

The disk drive unit 616 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media. The instructions 724 may also reside, completely or at least partially, within the static memory 706.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
causing working content to be displayed in a display zone of a graphical user interface of a device, the working content comprising a plurality of graphical objects;
generating, by at least one processor, a plurality of supplemental information items based at least in part on the working content, each one of the supplemental information items comprising at least one additional detail related to the working content;
causing, by the at least one processor, the plurality of supplemental information items to be displayed within a panel positioned adjacent to the working content on the device; and
causing, by the at least one processor, a data overlay to be displayed in the display zone in response to receiving a user selection of one of the supplemental information items, the data overlay overlaying and at least partially obscuring a corresponding portion of the working content, the data overlay including unchanged graphical objects and at least one additional graphical object, the unchanged graphical objects in the data overlay being aligned with and overlaying corresponding graphical objects of the plurality of graphical objects in the corresponding portion of the working content, the selected one of the supplemental information items corresponding to the at least one additional graphical object in the data overlay, and the at least one additional graphical object representing a modification to the corresponding portion of the working content.

2. The method of claim 1, wherein the unchanged graphical objects and the at least one additional graphical object comprise information in the form of at least one of alphabetical data, numerical data, and graphical data.

3. The method of claim 1, wherein the at least one additional graphical object comprises at least one additional detail related to the working content.

4. The method of claim 1, wherein the data overlay comprises a semi-transparent window.

5. The method of claim 1, further comprising:
applying the at least one additional graphical object to the corresponding portion of the working content in response to a user action on the device subsequent to the display of the data overlay overlaying the corresponding portion of the working content;
causing to be displayed, on the device, the application of the at least one additional graphical object to the corresponding portion of the working content separately from the data overlay; and
storing the application of the at least one additional graphical object to the corresponding portion of the working content in a database.

6. The method of claim 1, further comprising:
receiving a user selection of a portion of the working content; and
determining what supplemental information items to include in the plurality of supplemental information items based on the user selection of the portion of the working content.

7. The method of claim 1, wherein the working content comprises a table of data or a chart of data.

8. The method of claim 1, further comprising causing to be displayed, on the device, a history of modifications to the content that resulted from applying additional graphical objects from the data overlay to the working content.

9. The method of claim 1, further comprising:
capturing at least a portion of the working content;
generating a message, the message comprising the captured working content; and
enabling a first user to add text to the message before the message is sent to a second user.

10. A system comprising:
a machine having at least one processor; and
a supplemental information module on the machine, the supplemental information module being configured to:
cause working content to be displayed in a display zone of a graphical user interface of a device, the working content comprising a plurality of graphical objects;
generate a plurality of supplemental information items based at least in part on the working content, each one of the supplemental information items comprising at least one additional detail related to the working content;
cause the plurality of supplemental information items to be displayed within a panel positioned adjacent to the working content on the device; and
cause a data overlay to be displayed in the display zone in response to receiving a user selection of one of the supplemental information items, the data overlay overlaying and at least partially obscuring a corresponding portion of the working content, the data overlay including unchanged graphical objects and at least one additional graphical object, the unchanged graphical objects in the data overlay being aligned with and overlaying corresponding graphical objects of the plurality of graphical objects in the corresponding portion of the working content, the selected one of the supplemental information items corresponding to the at least one additional graphical object in the data overlay, and the at least one additional graphical object representing a modification to the corresponding portion of the working content.

11. The system of claim 10, wherein the unchanged graphical objects and the at least one additional graphical object comprise information in the form of at least one of alphabetical data, numerical data, and graphical data.

12. The system of claim 10, wherein the at least one additional graphical object comprises at least one additional detail related to the working content.

13. The system of claim 10, wherein the data overlay comprises a semi-transparent window.

14. The system of claim 10, wherein the supplemental information module is further configured to:
receive a user selection of a portion of the working content; and
determine what supplemental information items to include in the plurality of supplemental information items based on the user selection of the portion of the working content.

15. A non-transitory machine-readable storage device, tangibly embodying a set of instructions that, when executed by at least one processor, causes the at least one processor to perform operations comprising:
- causing working content to be displayed in a display zone of a graphical user interface of a device, the working content comprising a plurality of graphical objects;
- generating a plurality of supplemental information items based at least in part on the working content, each one of the supplemental information items comprising at least one additional detail related to the working content;
- causing the plurality of supplemental information items to be displayed within a panel positioned adjacent to the working content on the device; and
- causing a data overlay to be displayed in the display zone in response to receiving a user selection of one of the supplemental information items, the data overlay overlaying and at least partially obscuring a corresponding portion of the working content, the data overlay including unchanged graphical objects and at least one additional graphical object, the unchanged graphical objects in the data overlay being aligned with and overlaying corresponding graphical objects of the plurality of graphical objects in the corresponding portion of the working content, the selected one of the supplemental information items corresponding to the at least one additional graphical object in the data overlay, and the at least one additional graphical object representing a modification to the corresponding portion of the working content.

16. The device of claim 15, wherein the unchanged graphical objects and the at least one additional graphical object comprise information in the form of at least one of alphabetical data, numerical data, and graphical data.

17. The device of claim 15, wherein the at least one additional graphical object comprises at least one additional detail related to the working content.

* * * * *